(12) United States Patent
Zheng et al.

(10) Patent No.: US 7,840,632 B2
(45) Date of Patent: Nov. 23, 2010

(54) SYSTEM AND METHOD FOR PORTABLE MULTIMEDIA NETWORK LEARNING MACHINE AND REMOTE INFORMATION TRANSMISSION THEREOF

(75) Inventors: Wei Zheng, Shenzhen (CN); Tao Li, Shenzhen (CN)

(73) Assignee: New Noah Technology (Shenzhen) Co., Ltd., Futian District, Shenzhen, Guangdong Province (CN)

( * ) Notice: Subject to any disclaimer, the term of this patent is extended or adjusted under 35 U.S.C. 154(b) by 494 days.

(21) Appl. No.: 11/718,757

(22) PCT Filed: Jun. 20, 2005

(86) PCT No.: PCT/CN2005/000886
§ 371 (c)(1),
(2), (4) Date: May 7, 2007

(87) PCT Pub. No.: WO2006/072193
PCT Pub. Date: Jul. 13, 2006

(65) Prior Publication Data
US 2008/0098061 A1 Apr. 24, 2008

(30) Foreign Application Priority Data

| Jan. 5, 2005 | (CN) | 2005 1 0032720 |
|---|---|---|
| Jan. 18, 2005 | (CN) | 2005 1 0032883 |
| Jan. 28, 2005 | (CN) | 2005 1 0033077 |
| Feb. 2, 2005 | (CN) | 2005 1 0033171 |
| Mar. 28, 2005 | (CN) | 2005 1 0033886 |
| Mar. 28, 2005 | (CN) | 2005 1 0033887 |

(51) Int. Cl.
*G06F 15/16* (2006.01)

(52) U.S. Cl. ...................................... 709/202; 709/219

(58) Field of Classification Search .................. 709/219
See application file for complete search history.

(56) References Cited

U.S. PATENT DOCUMENTS

| 2002/0001386 A1* | 1/2002 | Akiyama | 380/201 |
|---|---|---|---|
| 2002/0107855 A1* | 8/2002 | Nishi | 707/9 |
| 2003/0046057 A1* | 3/2003 | Okunishi et al. | 704/1 |
| 2003/0049592 A1* | 3/2003 | Park | 434/322 |
| 2004/0214152 A1* | 10/2004 | Hoyashita et al. | 434/350 |

(Continued)

*Primary Examiner*—Hassan Phillips
*Assistant Examiner*—Natisha Cox
(74) *Attorney, Agent, or Firm*—Global IP Services; Tianhua Gu

(57) ABSTRACT

A kind of portable multimedia network learning machine, includes a microprocessor and a memory connected to the microprocessor, input unit and display, communication and download module, multimedia driving device and multimedia player. The said communication and download module are used for communicating with the calculator connected to the hand-held multimedia network learning machine, uploading effectiveness of instruction message file, and may download multimedia cartoon menu file and multimedia packages in step with teaching in the far end database server, transmit learning situation result to the learning situation receiving terminal. While multimedia driving device and multimedia player are used for driving and playing the said downloaded cartoon menu file and courseware. The present invention also provides a kind of system and method realizing remote information transition between hand-held multimedia network learning machines. The present invention also provides a kind of method for producing multimedia document which can be played in the hand-held multimedia network learning machine. The present invention could expediently produce multimedia document or swap data with remote server.

7 Claims, 15 Drawing Sheets

U.S. PATENT DOCUMENTS

2005/0058978 A1* 3/2005 Benevento .................. 434/362
2005/0129541 A1* 6/2005 Tsai ...................... 417/423.15
2006/0099562 A1* 5/2006 Carlsson ..................... 434/350

* cited by examiner

SYSTEM AND METHOD FOR PORTABLE MULTIMEDIA NETWORK LEARNING MACHINE AND REMOTE INFORMATION TRANSMISSION THEREOF

TECHNICAL FIELD

The present invention relates to a portable learning machine, more particularly, relates to a system and method for portable multimedia network learning machine (PMNLM) and remote information transmission thereof.

BACKGROUND OF THE INVENTION

Portable learning machines, such as PDA and portable e-dictionary, are more and more popular nowadays, especially for students. But the problem with the portable learning machines in the prior art are that all the learning functions, methods, and procedures are in built-in design during manufacture, even more, some of the learning contents are integrated. Therefore, the machines can not satisfy personal requirements of consumers; and even for those PMNLMs that are provided with updateable contents, the manufacturer will have to spend huge workloads to prepare courseware.

Although some of the portable learning machines in market are provided with the function of download learning contents from local computer or databases on remote servers via the Internet, but the operation is fussy and manual, the user has to download the contents one by one and independently, and automatic or intelligent download is not supported.

Moreover, the portable learning machines in the prior art provide simplex examination functions only, for the study status and progress, teachers, parents and student can not communicate with each other, and parents and teachers do not know how and what the students are studying. On the other hand, as students studied lots of knowledge, it is easy to disremember. Since there is no records, it will be very hard to track the knowledge, and when preparing the examination, the revision will become blindness and time-cost, for example, maybe some of the knowledge has been mastered but it is still being revised, and some knowledge has not been mastered but has not been revised.

The vocabulary mnemonics of the most portable electric learning machines normally applies Ebbinghaus Curve, that is, timely reminds the student to revise the learning content. But this mnemonics only focus on the vocabularies that already be recited, for the vocabularies do not be recited, there is no memory; moreover, for the vocabularies has already been recited by Ebbinghaus Curve, no memo exist any more, and the curve need be reset only if these vocabularies be recited again. With the metabolism of cerebra, the memorized knowledge will disremember gradually. Thus the mnemonics of the most learning machines are singleness and can not entirely simulate the knowledge that already be remembered, the content will forget along with the time lapse.

BRIEF SUMMARY OF THE INVENTION

The object of the present invention is to provide a PMNLM to solve the abovementioned problems in the prior art, and to provide a system and method for remote information transmission between such portable learning machines, as well as a method for preparing the multimedia files to be played by such portable learning machines.

The technical solution of the present invention is, providing a PMNLM, which comprising a micro-processor and a memory coupled thereon, an input device and a display, the memory is stored with a course schedule, a course hours file, a multimedia animation menu file and a multimedia courseware, wherein the PMNLM further comprising at least a communication and downloading module, a multimedia driver and a multimedia player, the communication and downloading module is for communicating with the computer that connected with the portable learning machine, uploading a teaching impression information file (the records and tracking of the studying status) via a "one key access" inspiring mechanism, downloading the multimedia animation menu file and multimedia courseware stored in a database of a remote server, and implementing the communication of information transferring and receiving between the PMNLMs, as well as inspiring the transmission of the teaching impression information file to a study-status receiving terminal; the multimedia driving device and multimedia player are for driving and playing the downloaded animation menu files and multimedia courseware.

Advantageously, the portable learning machine further comprises a memory point database unit which stored with memory point content, memory point index, and each memory point's skill level; a mnemonics module memorial unit comprising various mnemonics module programs for selecting by a main program P, each mnemonics corresponds to each memory point's skill level; an asst-study memory control unit controlled by the main program P to track the study status of the student, when one memory point is being studied and memorized, the main program P will intelligently select a suitable mnemonics module program according to the memory point's skill level of the student, meanwhile update this memory point's skill level and the corresponding date that the last time of contact with this memory point.

Advantageously, the input device is a keyboard which comprises catalog keys, English letter keys, vocabulary study keys to provide various ways for memorizing and revising, "one key access" key for downloading communication, network key for transferring files between two machines, Nmail key for editing mail.

The present invention further provides a system for transmitting remote information between the PMNLMs, which comprising a PMNLM, a PC, a remote server. Said PMNLM communicates with the PC via a download cable, the remote server communicated with the PC via internet, the system further comprises a study-status receiving terminal; the PMNLM comprises a memory unit for recording the study records and learning impression information files, and a communication transition unit for transmitting the information files to the PC automatically or by key-driven; the PC communicates with the remote server via internet, and the remote server comprises an intelligent analyzing module to analyze the received learning impression information files, and to determine a synchronous teaching materials, and then to generate a study-status result information; the study-status receiving terminal is associated with the PMNLM, and comprises an information receiving module for communicating with the remote server and receiving the study-status result information.

Advantageously, the database of the remote server is stored with the entire registered ID numbers of the PMNLMs, as well as the email information that did not received by the receiving terminal; these ID numbers and email information are used for ID verification of the PC communicated PMNLM, and for sending information to the PMNLM connected with PC for receiving information; the PC is installed with communication driver programs of automatically sending, receiving and downloading; the PMNLM is installed with a processing program, an email editing software and an email playing software in response to the instruction from the communication driver programs; the information transmission between the PMNLM and PC complies with the "one key access" communication protocol; and the information transmission between the remote server and PC complies with TCP/IP communication protocol.

Advantageously, the study-status receiving terminal comprises cell phone with short message function, desk phone or email receiving device, the study-status information from the remote server based on the user's subscription received by the terminal comprises attendance information, study trends information, homework analyzing, study details, examination ranking, parts or all of reviewing guidance; a short message sending module for sending the study-status information is provided between the remote server and the study-status receiving terminal.

Advantageously, a serial number is provided to associate the study-status receiving terminal, PMNLM, PC, synchronous teaching materials that download/upload from the server, and the teaching impression information file that send to the server; at least one part of the serial number is formed at the first time the PMNLM log onto the remote server, and each PMNLM forms an unique serial number at the first time log on.

The present invention further provides a method for implementing the information transmission between multiple PMNLMs, which is achieved inside a system with a PMNLM, a PC and a remote server, wherein the remote server stores the entire registered ID numbers of the PMNLMs, as well as the email information that was not received by the receiving terminal, intercommunication may be performed between the PMNLM and PC; the method comprises two steps of information sending and information receiving;

the steps of sending information further comprises the steps of: (a) setting the status of the information to be sent as "ready to send" on the PMNLM, and setting a serial number on the information receiving PMNLM; (b) connecting the PMNLM and PC, then perform automatically handshake authenticating thereof; (c) the communication driver program of the PC automatically inquires the PMNLM if there is any information need to be sent, the PMNLM then starts "NMAIL" management control to detect if there is any information need to be sent in the user's outbox, and then responds to the PC; (d) if there is information need to be sent, automatically uploads the information to the PC, and encrypts the information; (e) automatically connecting the remote server with the PC, and uploading the information need to be sent to the database of the remote server, then recording the ID serial number of the PMNLM which is sending and receiving the information; (f) deleting the mail that has already been sent from the "outbox", or transferring to the "outbox";

the step of information receiving further comprises the steps of: (h) connecting the PMNLM and the PC on the internet, and performing handshake; (i) acquiring the ID serial number of the PMNLM communicating with the PC by handshaking; (j) the PC automatically communicates with the database of the remote server, and searches whether any mail information that sending to the PMNLM with the corresponding ID serial number exists in the database; (k) if such information exists, downloading the information belongs to the PMNLM with the corresponding ID serial number to the PC; (l) the communication driver program of the PC then automatically decodes the information downloaded from the remote server and save to "inbox" of the user's PMNLM; (m) labeling the information as already sent in the database of the remote server.

Advantageously, a "one key access" key is defined on the input device of the PMNLM, when sending and receiving information, the two steps of information sending and receiving will be automatically achieved by simply press the "one key access" key for only once;

when enabled the "one key access" key, the PMNLM will further perform the following steps via the communication transmission unit: reading the new synchronous courseware on the remote server, and requesting to download the matched courseware base on the course time basic information, current time of the system, course schedule and running progress of a courseware correlation unit; uploading the user's teaching impression information file which comprising at least one of the times of the courseware be run, running recordation or study tracking; updating or amending the content of the courseware correlation unit to make it simultaneously reflect the using status of the current courseware; enabling the teaching impression information file to be sent to the receiving terminal.

The present invention further provides a method for preparing the multimedia file that can be played on the PMNLM. A communication and downloading module, a multimedia driven device, and a multimedia player are installed on the PMNLM, the multimedia file comprises animation menu file and multimedia courseware, wherein the method comprises the steps of: preparing a script file A1.ns or A1.txt in text format, and reading-in the script file as A1.txt in text format; format conversion, removing unnecessary spaces in the A1.txt and generating an A2.txt file, then opening this file and reading; decoding the instruction contained in the A2.txt on the corresponding position, generating an overall script file A3.txt; initializing the necessary environment variable of the multimedia file according to the certain instruction in the script; gathering all the files written in each area of the A3.txt, and generating relevant multimedia files base on the setting of the environment variable, these multimedia files comprises English courseware in *.nwe format, Chinese courseware in *.nwc format, examination courseware in *.nwx format, other multimedia files in *.nwf format, and nwf multimedia directory file that comply with animation menu file in .nmt format; downloading these multimedia files to the appointed catalog of the PMNLM through the communication and downloading module of the PMNLM.

Advantageously, the step of preparing a script file A1.ns or A1.txt in text format, and reading the script file as A1.txt by the text format further comprises the steps of: (a1) enabling the multimedia courseware creating tool NflashMX that based on Windows, and setting the machine type, internal file name and courseware information; (a2) editing the drawings and multimedia by the visible NflashMX multimedia object creation interface, or directly editing the relevant work script files; (a3) generating corresponding script file A1.ns.

Advantageously, the method further comprises the step of playing the courseware on the PMNLM: entering the courseware study interface, the PMNLM then listing all the current courseware files, and orientating the closest courseware according to the schedule preset by the user, as well as the course hour file and the current time of the system; loading the courseware player of the PMNLM once the user selected a certain courseware; detecting the validity of the courseware; initializing the courseware's instruction cache, instruction pointer and stack parameter; inquiring whether the instruction cache is empty; if it is empty, read the courseware instruction to the instruction cache via a file system; checking the validity and integrality of the courseware, and then load and run the courseware.

Advantageously, the method further comprises the step of playing the animation menu on the PMNLM: acquiring the animation menu data by the animation menu driver program according to the level of the menu, the serial number of the menu in the level, the animation menu comprises multimedia data pointer of the current animation menu; playing the current animation menu by the player according to the multimedia data pointer of the current animation menu, and this step comprises: loading the player that set on the PMNLM by the driver of the multimedia data pointer of the current animation menu driver program; detecting the validity of the courseware, and initializing the courseware's instruction cache, instruction pointer and stack parameter; reading the courseware instruction to the instruction cache; checking the validity and integrality of the courseware, and loading and running the courseware; the menu driver program estimating whether to enter a certain menu or exit the menu to enter the applying program and following the relevant operation, according to the return value of the current played animation menu.

Advantageously, the step of preparing the script file A1.ns or A1.txt in text format and reading-in the script file as A1.txt is achieved by a Nec.exe translation and editing tool.

Advantageously, the method further comprises the steps of combining groups of .nwf multimedia files which measure up with the animation menu criterion of portable terminal into a txt script file in text format, and creating a animation menu file in .nmt format by using the nmt.exe editing tool.

The advantages of the present invention are, the PMNLM is with simple configuration and it is easy to operate, especially the "one key access" configuration combining with the system and method for remote data transmission between the PMNLMs, makes the PMNLM easily transfer synchronous courseware and mails with the remote server. Further, the PMNLM makes the parents easily know the study status of their children. Moreover, the mnemonics provided in the present invention will evidently improve the memory impression of the user due to the application of different mnemonics on different user's skill level. Additionally, the method of preparing multimedia files as provided in the present invention makes the user create the courseware and animation menu files on the PMNLM, thus to increase the value of the PMNLM.

DETAILED DESCRIPTION OF THE INVENTION

Figure 1:
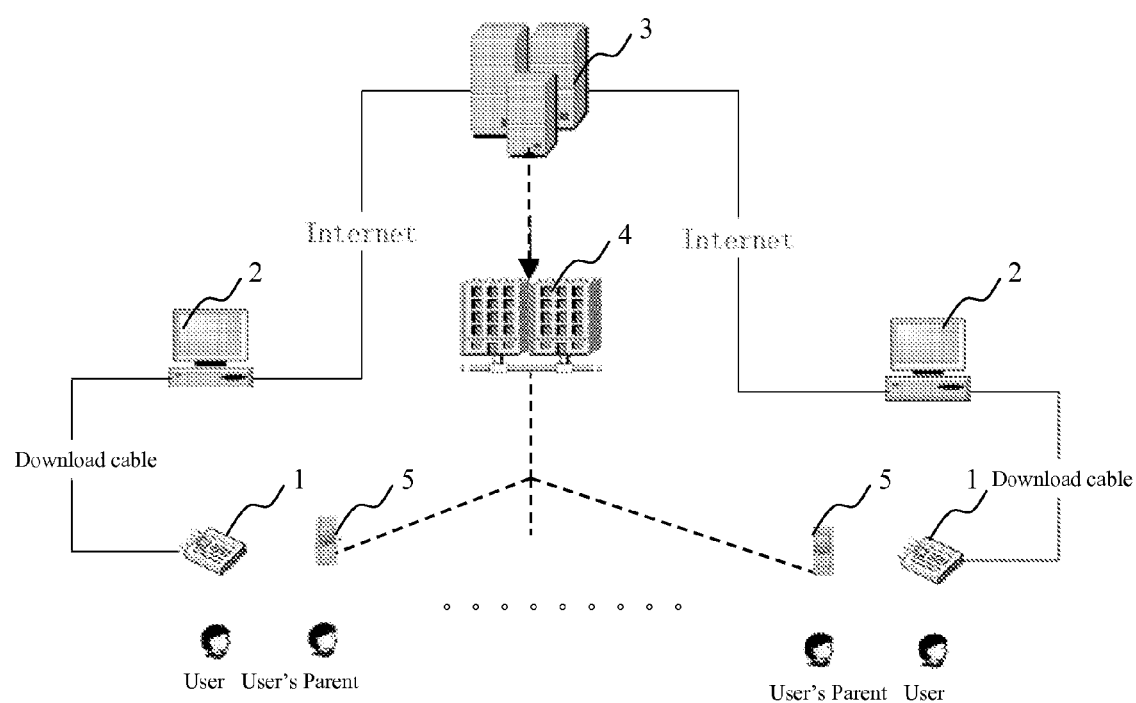
FIG. 1 shows one embodiment of the present invention of the system to realize the information transmission between PMNLMs.

As shown in FIG. 1, one embodiment of the present invention of the system to implement the information transmission between PMNLMs is provided. The system comprises a PMNLM 1, a PC 2 connected with the PMNLM, a remote server 3 connected with the PC via internet, a cell phone short message sending module 4 connected with the remote server, a study-status receiving terminal 5 for receiving the information from the sending module. Each part of the system is described in detail hereafter.

Figure 3:
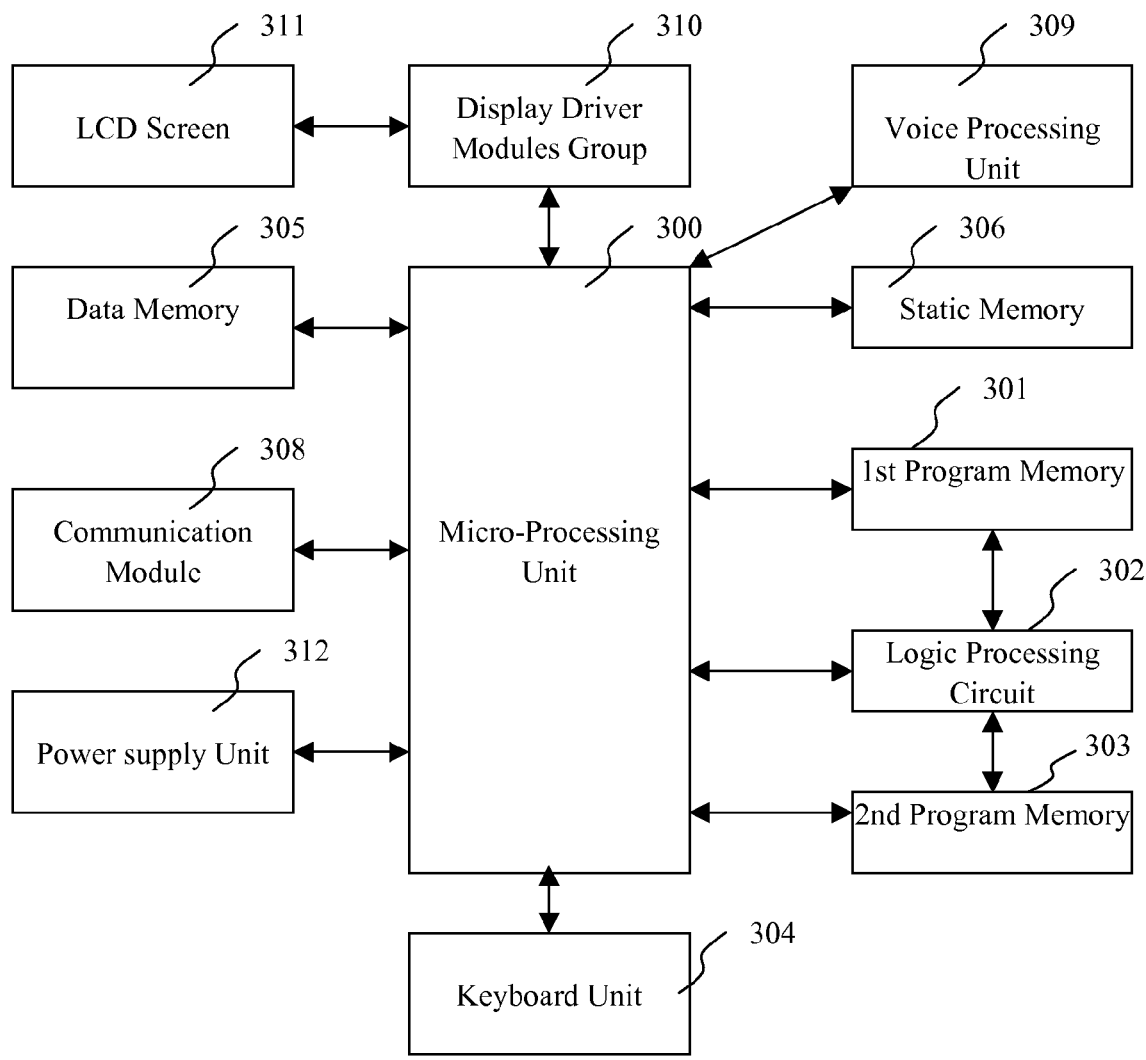
FIG. 3 shows the internal structure of the PMNLM of the present invention.

The PMNLM 1 is similar with the downloadable electric dictionary or other downloadable terminal, the internal structure of which is shown in FIG. 3, which comprises a microprocessor unit 300, a first program memory 301, a logic processing unit 302, a second program memory 303, a keyboard unit 304, a data memory 305, a static memory 306, a communication transferring unit 308, a voice processing unit 309, a liquid crystal driver unit 310, a LCD 311 and a power supply unit 312, wherein the first program memory 301, logic processing unit 302 and the second program memory 303 together form a program memory. A certain program is preset and run in the memory to connect with the PC 2 for controlling the download and selectively implementing the downloaded program.

The PMNLM 1 can transfer data with the remote server 3 via the PC 2, and can download the synchronous teaching materials (synchronous studying contents) from the remote server 2 for exploring and studying, the synchronous studying contents comprising the divisions of vocabulary reciting, text studying, explain learning, exercising, examination, test exercising and Chinese Character studying, etc.; the synchronous teaching materials downloaded from the server at least comprises one of the following division: text, explain, exercise, exam, test paper, Chinese Character and recitation, the data recorded in each division at least comprises the implemented starting time and total time. The recordation of divisions further comprises error data, attendance information, study trends, homework analysis, details of the study, list of examination or review guidance, etc. During the synchronous study, the PMNLM will record the teaching impression information such as duration of study, stresses distribution, time distribution and errors occurred in examination, thus to generate a teaching impression information file (namely, study status recordation). The communication transferring unit 308 of the PMNLM will send the teaching impression information file to the PC automatically or driven by key. In the present invention, when the PMNLM is connected with the PC, the driver software of the PC will automatically acquire the user's teaching impression information file, and intelligently upload it to the remote server 3. In one embodiment of the present invention, a key for transmission the teaching impression information file to the PC is set on the PMNLM; it is called as "one key access". By enabling the "one key access", the PMNLM will perform the following steps with its communication transferring unit:

reading the new synchronous courseware on the remote server, and inquiring download the matched courseware according to the course hour basic information, current time of the system, course schedule and running progress of a courseware correlation unit;

uploading the number of times the courseware ran, running recordation or study tracking;

updating or amending the content of the courseware correlation unit to make it synchronously reflecting the using condition of the current courseware;

sending the mail information to the remote server to update the data with the driver program of the PC;

sending and receiving mail information;

enabling the teaching impression information file, and then sending it to the receiving terminal.

The PC may comprise conventional PCs; it is equipped with a communication unit that suitable for communication with the PMNLM, it may apply common RS232 serial communication or USB communication, or infrared or Bluetooth protocol communication. An application program for communication (such as DLsprite) is installed on the PC. When the PMNLM of user is connected with the PC 2, the PC 2 installed with corresponding applications will automatically acquire the teaching impression information file in the PMNLM 1, and automatically sent the file to the database of the remote server and stored therein once the PC 2 is connected with internet.

An intelligent analyzing module is provided in the remote server 3 to analyze the teaching impression information file, and to gather the information of the user's synchronous download frequency, study time distribution and knowledge leak in a selected time period, thus to generate a study status analysis result or teaching impression information. Additionally, if there's no synchronous download for a long period, or no synchronous study happens and no study status recordation, a warning report of study status will be generated. The remote server 3 can send the teaching impression information by short message service, email or printing and mailing. For example, in one embodiment of the present invention, short message service is applied to send the study status analysis result. The remote server 3 having a short message sending platform with a short message sending module 4, once the short message sending module 4 get the instruction from the remote server 3, it will send the study status analysis result to the study status receiving terminal 5 (such as the appointed cell phone).

The study status receiving terminal 5 may comprise cell phone or fixed landline phone with short message function, or an email receiving device. The cell phone, fixed landline phone or an email receiving device may be appointed by the parents of the student, and the study status analysis report can be subscribed, such as subscribe the classified content of the analysis report, the receiving manner (for example, telephone number or email address) and the appointed receiver. The detail of the study status analysis report comprises parts or all of work attendance information, study trends, homework analysis, study status, exam list and review guidance.

A serial number is provided to associate the study-status receiving terminal with the PMNLM, at least one part of the serial number is determined at the first time the PMNLM logs on the remote server, and each PMNLM generates a unique serial number at the first time logs on. The automatically downloaded synchronous teaching materials from the remote server to the PMNLM is compressed and encrypted, and once it is received, it will be decoded automatically, and the password for decoding is associated with the ID serial number of the PMNLM. As the user requires "synchronously" study, the synchronous teaching materials need to be downloaded frequently, so the remote server will accumulate the user's study recordation, and the intelligent analysis module will get the analyzing result momentarily.

Figure 2:
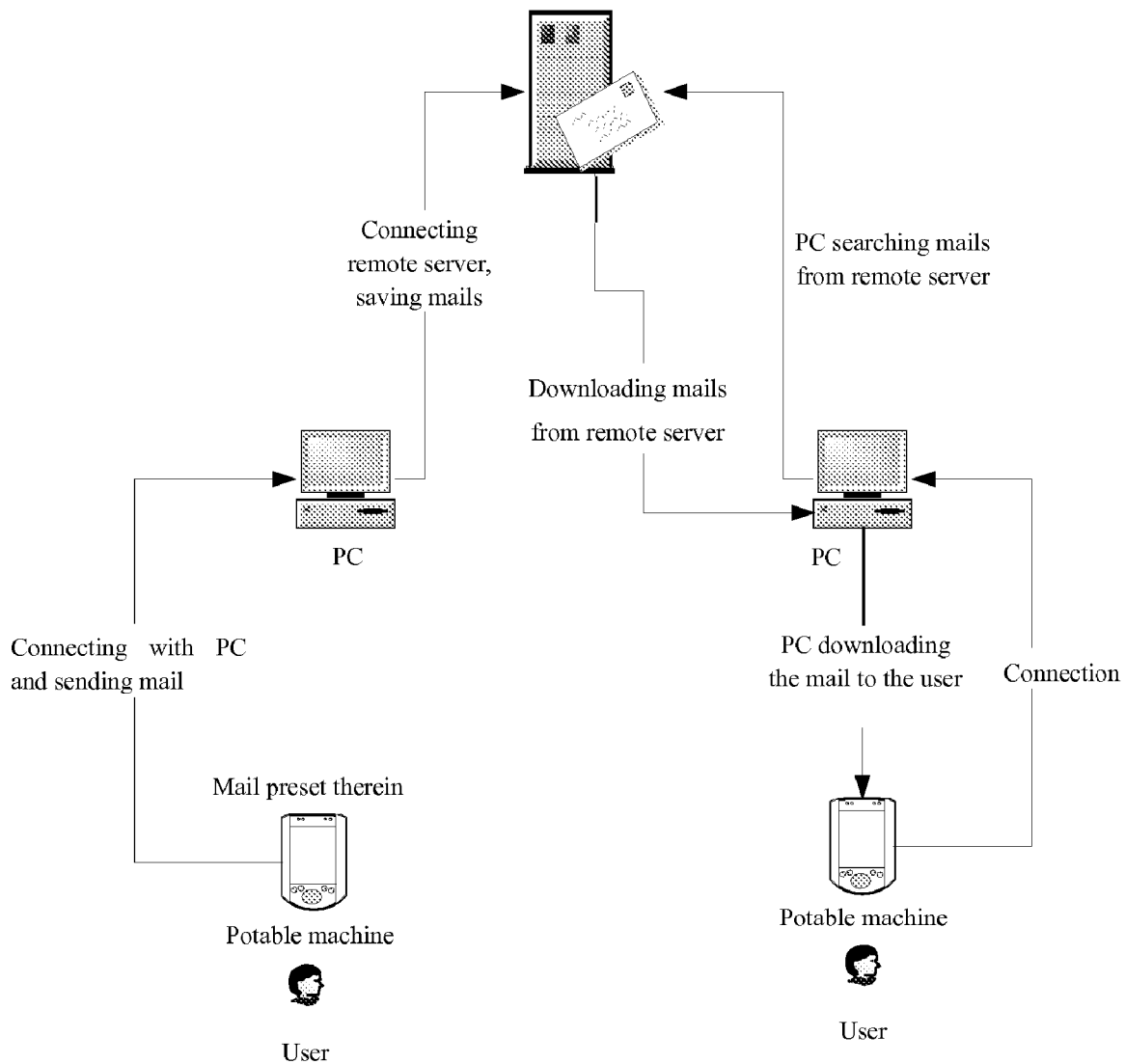
FIG. 2 shows another embodiment of the present invention of the system to implement the information transmission between PMNLMs.

FIG. 2 shows another embodiment of the present invention, in this embodiment, the PMNLM may transfer (sending or receiving) mails between the PC and the remote server.

Figure 4:
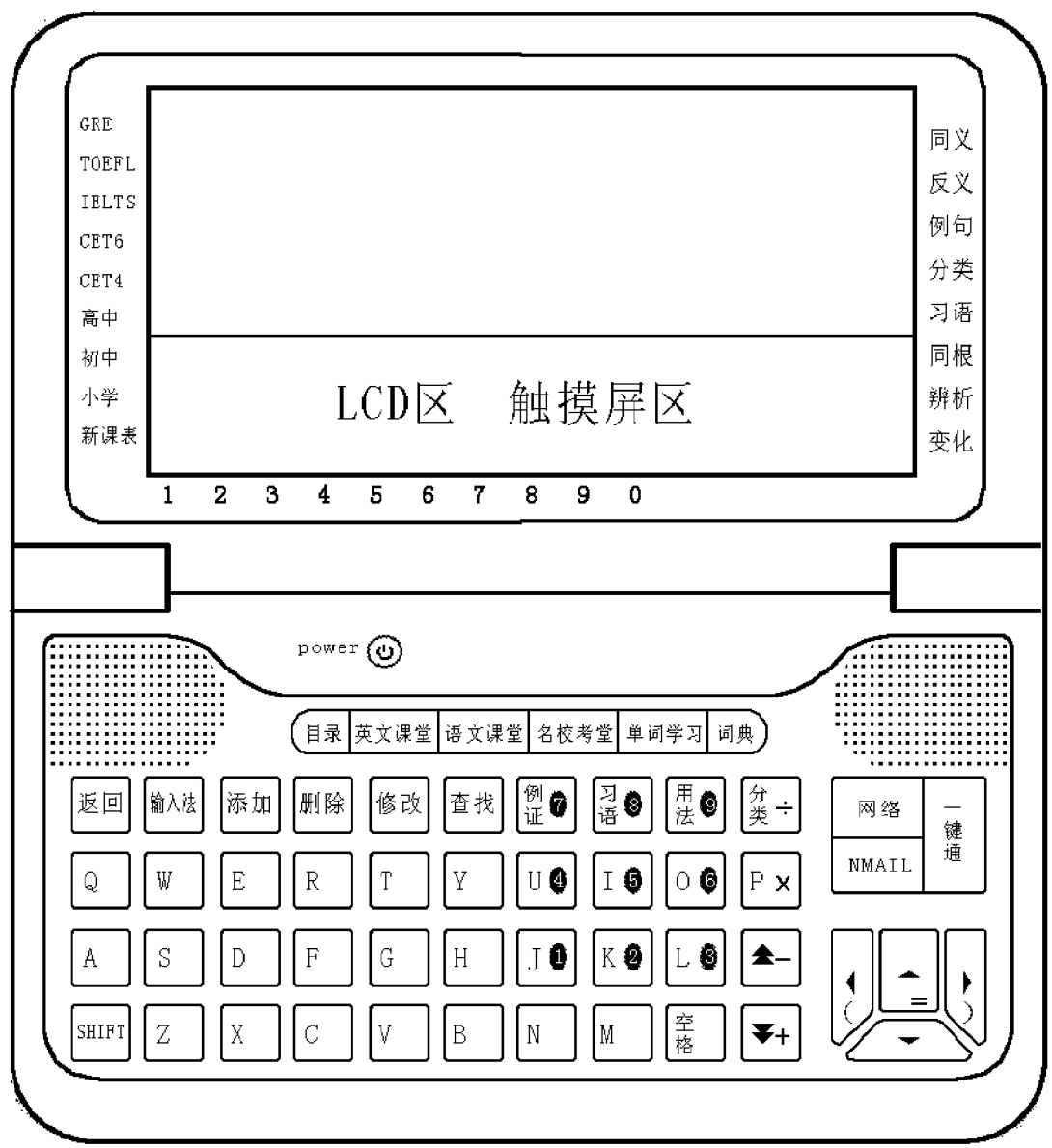
FIG. 4 shows the operation interface of the PMNLM of the present invention.

As shown in FIG. 4, the operation interface of the PMNLM of the present invention is provided. The operation interface comprises an LCD on the upper side, an operation keyboard and a phonation device on the lower side. The keyboard is installed and fixed on the upper surface of the shell of the PMNLM, and a cover is set thereon; the LCD is set on the inner surface of the cover, the shell and the cover is engaged on the backside in loose-leaf manner, or overlap together in push-and-pull manner, or rotatively engaged; an I/O interface for connecting peripheral equipment is set on the side face of the shell. The keyboard comprises English letter keys, NCELL vocabulary reciting keys, input method selection key, "one key access" function key, Internet key, numbers keys, orientation keys and user-defined functional keys. Wherein the English letter keys are for inputting English words and sentences; the NCELL vocabulary reciting keys are for enabling the system entering the status of vocabulary reciting, tracking the contents of the student is memorizing, and intelligently providing various mnemonics; the "one key access" function key is for synchronously downloading the user's study courseware, uploading the teaching impression files, sending and receiving mails information, inspiring study-status reporting mechanism; the Internet key is for downloading information from the PMNLM connected with PC or inter-transferring files between PMNLMs; the input method selection key is for switching the inputting manners of English character input, Chinese character input and manuscript character input; the numbers key are for counting or inputting mathematics formulae or inputting accessorial selections; the orientation keys are for moving cursor; the user-defined functional keys are for defining some regular functions by the user itself.

The PMNLM of the present invention further provides the function of NCELL memory snapshot. The micro-processor of the PMNLM is controlled by the main program P, the memory is stored with the main program P, database of studying materials and the skill levels thereof, and memory point database unit, mnemonics module storage unit and asst-memorizing control unit. The main program P will select and implement different mnemonics programs according to the user's skill level on certain memory points. And the memory point database unit is stored with memory point contents, memory point index and skill levels for each memory point; the mnemonics module memorial unit with various mnemonics module programs is for selecting by a main program P, each mnemonics corresponds to each memory point's skill level; the asst-study memory control unit is controlled by the main program P to track the study status of the student, when one memory point is being studied and memorized, the main program P will intelligently select a suitable mnemonics module program according to the memory point's skill level of the student.

The memory point content comprises English vocabulary, English sentence, English grammar, formulas for mathematics, physics and chemistry, Chinese Tangsong Poetics, Chinese text, Astronomy and Geography, download materials, and other subjects, also, certain affair can be deemed as a memory point.

All the memory points are numbered, and each memory point is set with a skill level, when the user accessing a certain memory point, the skill level of this memory point will increase, and the corresponding date will be recorded. As time lapsing, the skill level for the vocabularies will attenuate; as the skill level of one vocabulary attenuated to a critical level, it will be listed in a memory or memory enhancement program.

The memory or memory enhancement program is a remembrance process that at the assistant of hardware and software, this process will apply different mnemonics according to the skill level of a certain memory point.

Figure 5:
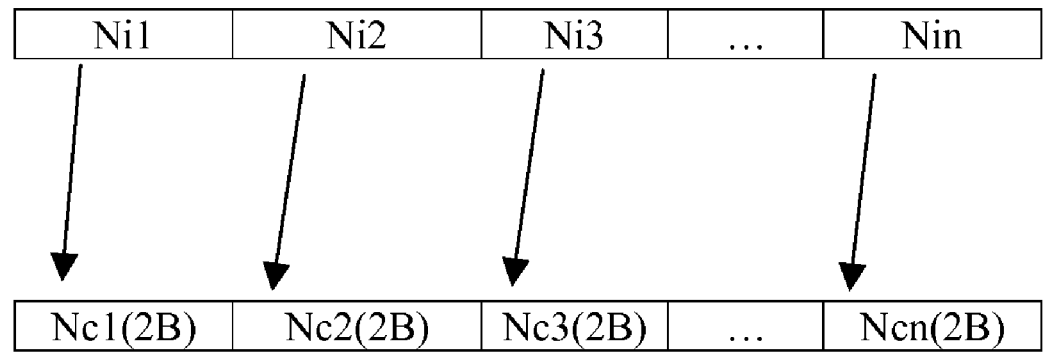
FIG. 5 shows the data configuration of the PMNLM of the present invention.

FIG. 5 shows the data configuration of the PMNLM of the present invention, this database comprises memory point content, memory point index and skill level data area. The system software will search the address of skill level data in accordance with the memory point content, then process the data at the skill level data area. The "Ni" in FIG. 5 means the index list of the memory point, it has two parts: memory, the skill level address of the memory; "Nc" means the memory data of the memory point, it also has two parts: the skill level changed at the last time ND and the last time that accessed the vocabulary NT; ND occupied 4 bit and may indicate 16 levels of skill level; NT occupied 12 bits and may record 12 years time period, so all the courses from grade school to senior high school of a student could be recorded therein.

Figure 6:
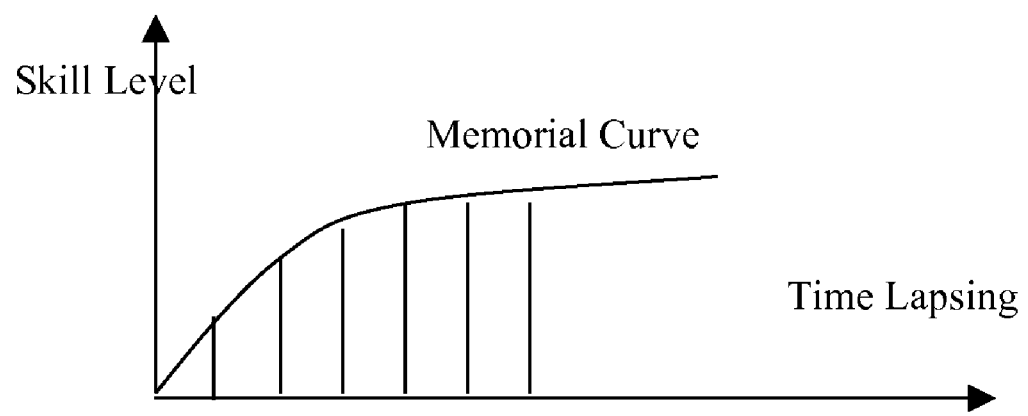
FIG. 6 shows the memory curve of the present invention.

The different mnemonics comprises transcribing, selection, filling in blank, writing, exploring and game. The intelligent memory means selecting different mnemonics according to different skill level of memory point, if the skill level is low, the system will select simpler mnemonics such as transcribing and selection; if the skill level is high, the system will select mnemonics such as exploring and game, the relevant knowledge just pass through the user's cerebrum and do not need to waste time in revising. Once the memory program of a memory point is finished, the skill level will reach maximum value; this memory point will then remain in the user's cerebrum for a long time. The matching of each study condition and each kind of mnemonics is shown as follows:

Continually revising the studied content will increase its skill level. Therefore, a new content requires a scientific mnemonics, this scientific mnemonics will timely remind the user to review the content till the skill level is saturated, and the remembrance of the knowledge will last for long time. As shown in FIG. 6, the change of skill levels is provided after the second day reminder, the third day reminder, the fifth day reminder, the eighth day reminder, the tenth day reminder, the eleventh day reminder.

As time lapsing, something in the cerebrum will fade, and the skill level of each memory point will decrease. For those which remembered profoundly, the time period for fading is long, and for those which remembered superficially, the time period for fading is short. The skill level of a memory point will decrease with time lapsing, as shown below:

| Skill Level | unacquaintedness | Fading Speed (days for decreasing one level) |
| --- | --- | --- |
| 0-5 | unacquainted | 7 |
| 6-10 | Skilled | 15 |
| 11-15 | Saturated | 30 |

Improvement of skill level: everything will create a memory when it reached to the cerebrum, if this memory appears again, it will enhance the skill level. The PMNLM can help the user to improve the skill level according to the time and number of times of memorization. The increasing and decreasing of the skill level is a contrary process, which means low skill level needs constantly revision to improve the skill level by transcribing, filling in blank, writing and reading.

| Memorizing Manner | Increasing Speed (the level increased) |
| --- | --- |
| Transcribing | 2 |
| Selection | 2 |
| Filling in Blank | 3 |

| Skill Level | Strangeness | Mnemonics | Screen Displaying |
| --- | --- | --- | --- |
| 0-2 | unacquainted | Transcribing | Display vocabulary and its explanation; The User input the spelling of the vocabulary, if matched, this level is passed. |
| 3-5 | Unknown vocabulary | selection | Displaying one meaning of a vocabulary and plentiful of vocabulary entries; The user needs to select one correct vocabulary entry. |
| 6-10 | Skilled | Filling in blank | Giving the Chinese explanation of an English vocabulary, stochastic parts of the vocabulary is in blank; The user needs to fill in blank with correct letter. |
| | | Writing | Giving the vocabulary entry; The user needs to write out the explanation of the vocabulary. |
| 11-15 | Saturated | Exploring | Just exploring the vocabulary; Set options: auto explore/manual explore (the explore speed can be set); acceptation recollection/vocabulary recollection (acceptation/vocabulary will recollect separately); capitalization of the vocabulary. |
| | | Game | Such as associating, bumblepuppy, forting, star wars. |

-continued

| Memorizing Manner | Increasing Speed (the level increased) |
|---|---|
| Writing | 3 |
| Exploring | 1 |
| Game | 1 |

The PMNLM of the present invention factually simulated the memory process of human's cerebrum, it is be called as memory snapshot (NCELL) system. As metabolism of the cerebrum, the memorized content will forget gently, the system of the present then simulate this forgetting process with time lapsing, dynamic track the user's mastering of the memory point, and remind the user to review the memory point.

Figure 7:
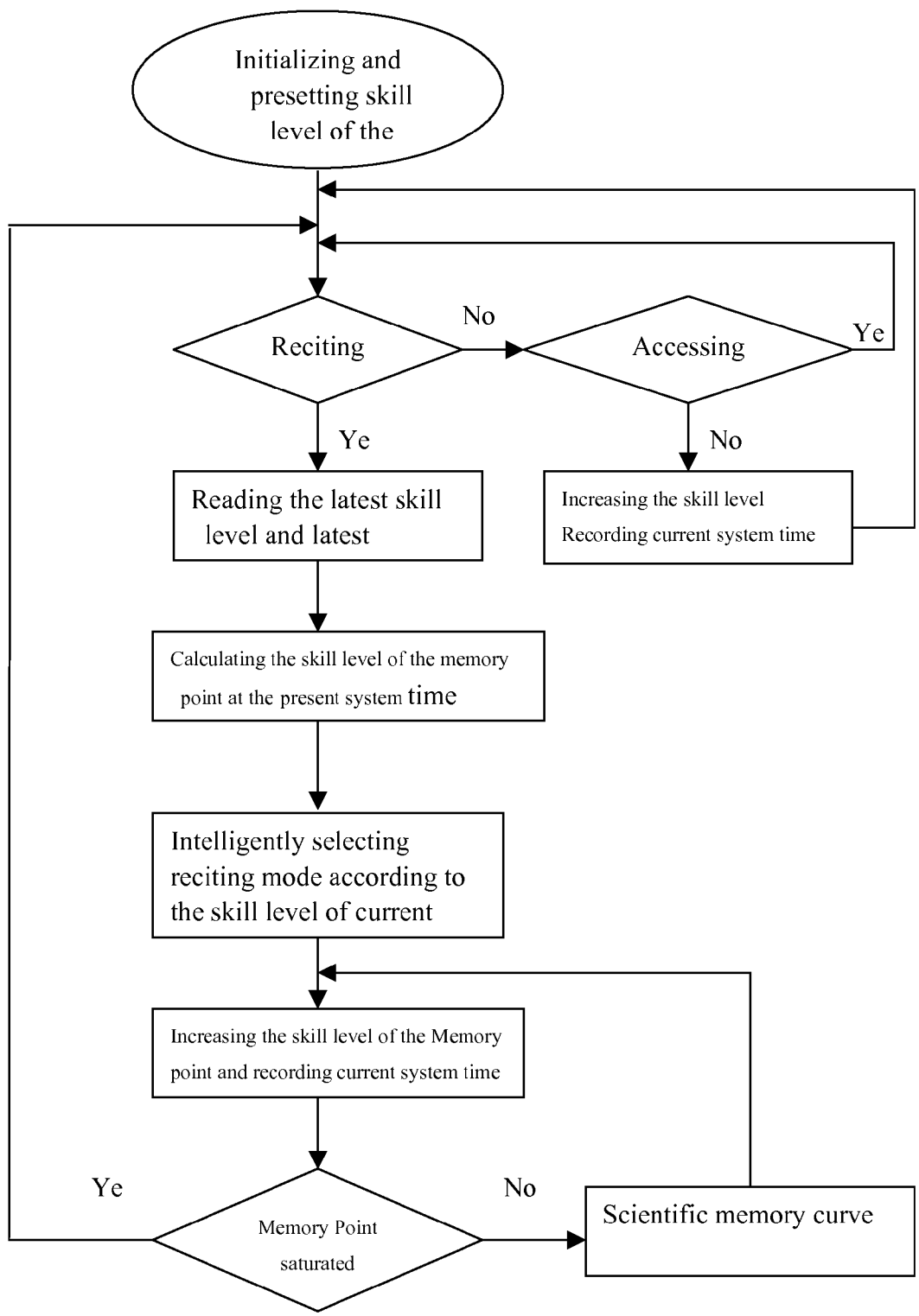
FIG. 7 shows the operation flow of the main program P of the PMNLM of the present invention.

FIG. 7 shows the operation flow of the main program P of the PMNLM of the present invention. For the first time the student uses this method, he/she may have forgotten some contents, thus the skill level of the memory point need to be initialized and preset, and then the memory system will track contents which the user is memorizing, if a new memory point is memorized, it will be put into a historical memory stack; if a memory point is accessed, the skill level of this point will be increased and the current time will be recorded also, and then return to A. When reciting a memory point, read out the last skill level and last access time, and calculate the skill level of the memory point at the current time; then intelligently select different mnemonics according to the skill level, namely, intelligent memory; and then increase the skill level of this memory point, update the last contact time of the skill level; and finally, estimate whether this memory point is saturated, if that, return to A, if not, then apply the scientific mnemonics of FIG. 5, and timely remind the user to revise till the skill level of this memory point reaches saturation, then return to A. The skill level of the memory point will decrease with time lapsing, once it decreases to a certain level, a preset program in the micro-processor will automatically set this memory stack as memory enhancement program, and re-enter the scientific mnemonics of FIG. 5.

Then return to FIG. 2, another embodiment of the present invention of the system to implement the mail transmission between PMNLMs is provided; the information transmission between PMNLMs is called as "NMAIL" to differ with the well-known "EMAIL". The PC is provided with auto sending, auto receiving, and auto downloading one-off achieving communication driver program in respond to the "one key access" key; the PMNLM is equipped with a processing program for responding and implementing the communication driver program; the PMNLM, PC and the remote server comply with the "one key access" communication protocol; the PC and remote server comply with TCP/IP communication protocol. The "one key access" communication protocol applies simplex-duplex to implement real-time transmission of the data. The communication protocol supports the basic functions of data upload and download, catalog build and delete, data inter-transfer between two PMNLMs or between PMNLM and PC, two PMNLM interconnected gaming, NMail sending and receiving, one key access, etc.

The database of the remote server is stored with the entire registered ID numbers of the PMNLMs, as well as the email information that was not received by the receiving terminal. A mail editing software is installed in the memory of the PMNLM, and a NEPLAYER software for playing the multimedia mail is also installed therein; the mail editing software can be utilized as an editing platform for the multimedia mail, and the mail also can be set as auto play, start-up menu, timely remind, festival remind or count down. The PC and the PMNLM may inter-communicate with each other, and before that, the PC and the PMNLM need a handshake procedure, which comprises:

a. handshake detection to verify the communication speed, both of the PMNLM and the PC plight a basic baud rate, the monitoring port of PC waits for response from the PMNLM, the PMNLM sends out certain character string "HSK_STR" as a response, if there is an error response, the handshake will fail;

b. Enabling mode and version detecting, once the handshake is passed, PC will feedback an ACK, the PMNLM will send Comm_Mode to notify whether the enabling mode is auto sending, auto receiving, and auto downloading one-off achieving "one key access" mode, or user manual selecting menu uploading and downloading mode; if the enabling mode is not ratify by the PC, it will not pass the detecting;

c. Machine model ID verification, the PC needs to know the ID of the connected PMNLM, thus to communicate with the remote server, once the ID is verified, the PC will adjust its port's baud rate to match with the communication speed of the PMNLM, and preparing for subsequent communication; the PMNLM will then enter standby mode.

The communication processes between the PC and the PMNLM after said handshake include the PMNLM downloading and uploading files through menu access. Each user of the PMNLM has a unique personal ID (PID) to distinguish with each other.

In the transmission of NMAIL, a PID address and the start up mode of the receiving end are attached therein. The remote server will build a relevant NMAIL database on the receiving end according to the PIN address of the NMAIL, and keep the NMAIL into the "send-box" of the database, then wait for communication with the receiving end. If the PMNLM on the receiving end is online, then the NMAIL will be sent to the relevant personal processor controller of the receiving end via the driver program of the PC, and then through the personal processor controller to download the NMAIL to the PMNLM via a download line (such as USB, UART or wireless communication).

The PMNLM saves the received NMAIL to "in-box", and meanwhile builds the received startup mode into a NMAIL startup bookmark.

For the management of NMAIL, each NMAIL is built with a relevant NMAIL label bookmark to mark the status of the NMAIL, such as whether to be started up, whether to be forwarded, whether to be deleted, and also, the label bookmark comprises the sender's PID address, receiver's PID address and the receiver's startup mode.

Patterns of the startup bookmark are as follow:

| Title of the NMAIL | Startup Time | Startup Mode |
|---|---|---|

Patterns of the label bookmark are as follow:

| Title of the NMAIL | Send PID | Receive PID | Status of the NMAIL | Startup Mode |
|---|---|---|---|---|

There are three ways for transmission:
1. "one key access" communication, in this way, no manual process is required, similar to PCs, once the PMNLM is linked with internet, and press the "one key access" key, it will automatically send and receive all NMAIL files.
2. Internet transmission via PC, in this way, it requires entering relevant menu manually, it will be a little more troublesome.
3. dual machine inter-communicate, two or more users may apply this method to inter-communicate with each other, and to directly transfer files by menu processing.

In the present embodiment, the media for transmission comprises Internet, transferring programs, USB, UART, infrared ray, wireless, PDA, servers or PCs.

The content of the NMAIL may comprises debonair remind, study persuading, encouraging, study status report, festival remind, birthday blessing, and other information such as FLASH, greeting or well-wishing.

The startup methods comprises boot-strap, festival remind, count down or timely remind, etc.

Figure 8:
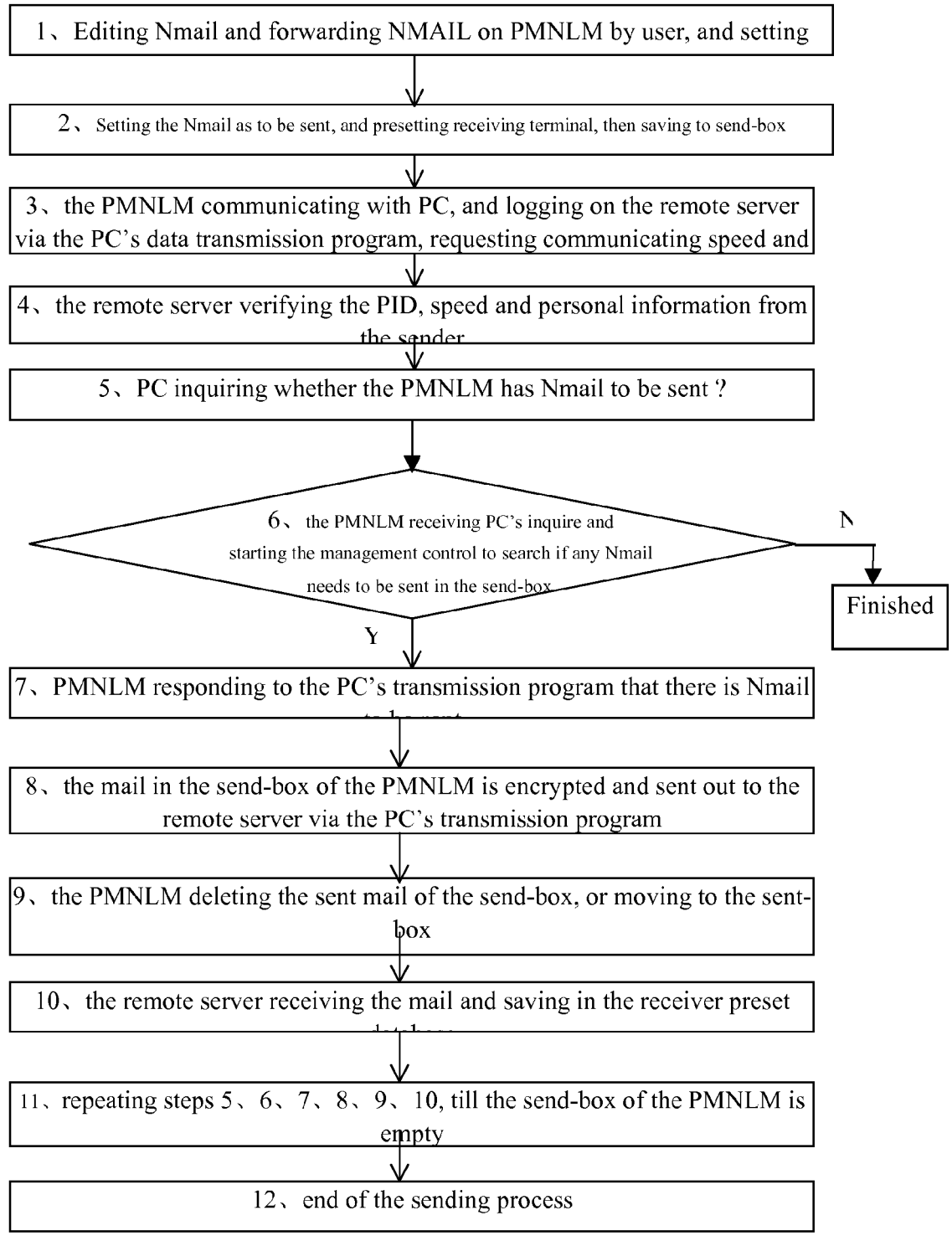
FIG. 8 shows the mail sending flow of the PMNLM of the present invention.

FIG. 8 shows the mail sending flow of the PMNLM of the present invention, wherein comprise the steps of:

the user edit the Nmail that needs be sent on the PMNLM or PC, and saves it in the send-box, then set startup mode and preset receiving terminal;

after the PMNLM is connected with the PC via the internet, then continue the following three steps for of handshake: 1) the PC monitoring and receiving the communication speed that required by the PMNLM; 2) the PMNLM sending the enabling mode as "one key access" mode or manual downloading mode; 3) the PC verifying the ID and communicate speed of the PMNLM, and sequentially communicating with the PMNLM at the required speed;

the PC logging on to the remote server via a data transmission program (DLSprite, for example), and asking for verifying ID and communicate speed; then verifying the ID, speed and updated personal information of the send end by the remote server;

the PC transmission program automatically inquiring whether the PMNLM terminal has any Nmail to be sent; the PMNLM will then be receiving the inquiring and starting management control of the ExplorerNmail to search whether any Nmail to be sent exist in the send-box of the Nmail directory path;

the PMNLM then responding with the transmission program of the PC, and feeding back there is an Nmail to be send; then automatically uploading the Nmail of the PMNLM to the PC and start encrypting;

the PC then automatically upload the Nmail from the send-box of the PMNLM to the remote server by the transmission program; the PMNLM then deleting the sent Nmail in the send-box, and forwarding the sent Nmail to the sent-box; the remote server the storing the received mail into the relevant database that preset by the receiver;

repeating the above described processes till the send-box of the PMNLM is empty; the sending process is then finished.

Figure 9:
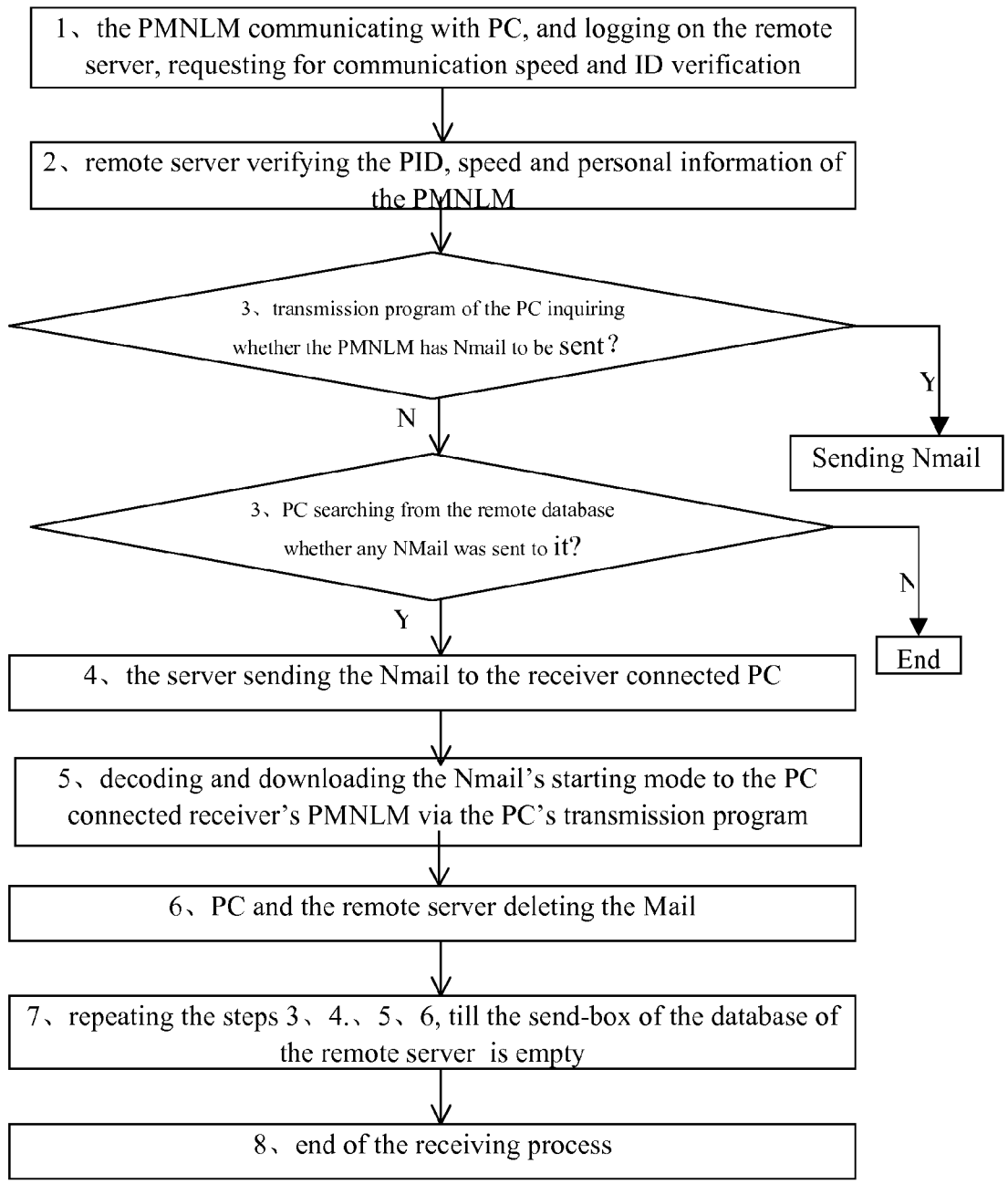
FIG. 9 shows the mail receiving flow of the PMNLM of the present invention.

FIG. 9 shows the mail receiving flow of the PMNLM of the present invention, wherein comprises the steps of:

after the PMNLM is connected with the PC on the internet, then continue the following three steps for handshaking: 1) the PC monitoring and receiving the communication speed that required by the PMNLM; 2) the PMNLM sending the enabling mode as "one key access" mode or manual downloading mode; 3) the PC verifying the ID and communication speed of the PMNLM, and starting communication driver program, automatically detecting the user's ID serial number of the PMNLM;

the PC logging on to the remote server via a data transmission program (DLSprite, for example), and asking for verifying ID and communication speed;

the remote server then verifying the ID, speed and updated personal information of the portable device;

the PC then starting the communication program, automatically inquiring whether the PMNLM has any information to be sent; the PMNLM then starting "NMAIL" management controller to detect whether there is any mail to be sent in the send-box, and responding to the PC;

the PC then automatically communicating with the database of the remote server to search whether there is any Nmail to be sent to the PMNLM, if there is, the remote server will send the Nmail to the connected PC, and the server will be deleting the Nmail at the same time; the PC then decoding and downloading the Nmail and its startup mode to the in-box of the connected PMNLM;

the PC then deleting the NMAIL from its send-box, and mark the status as already been sent in the database of the remote server;

repeating the processes described above till the send-box of the database that corresponding to the receiving user's server is empty; the receiving process is then finished.

The present invention further comprises the step of preparing courseware and animation menu that playable by the PMNLM.

Figure 10:
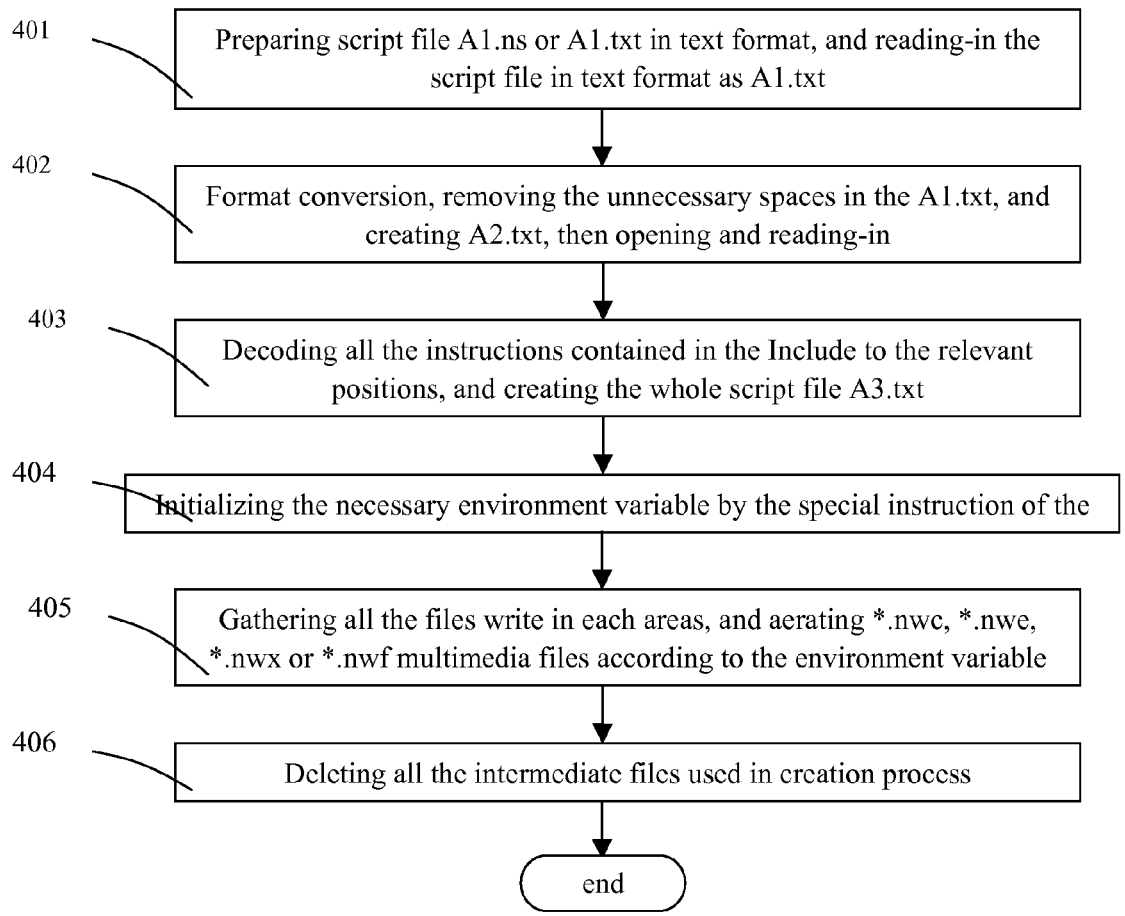
FIG. 10 shows the multimedia script editing flow of the PMNLM of the present invention.

As shown in FIG. 10, the multimedia script editing flow of the PMNLM of the present invention is provided; this process usually is implemented on a computer, and also can be implemented on a PMNLM with at least 8 bit of MCU.

In the present embodiment, the format of the courseware comprises: multimedia files in .nwf format, explorable or amendable text script files in .txt format, explorable or amendable text script files in .ns format, explorable or amendable text work files in .npr format, English courseware in .nwe file, Chinese courseware in .nwc format, and examination courseware in .nwx format.

The language for preparing courseware mostly is Nflash language, but this language is developed focus on portable system especially for 8 bit MCU. Another NEP language is developed focus on study; it comprises, summarizes and encapsulates the actual common study behaviors into instructions. The present invention is just applying NEP and Nflash instructions to prepare lively, rich and colorful courseware.

In the present invention, the NEP instructions comprise: 3 items of control instructions (TrueEcho, FalseEcho, TrueExplain), 6 items of vocabulary reciting instructions (StudyWords, PokeWords, GalxysWords, QlookWords, LinkWords, ListenWords), 3 items of text instructions (TextPlay, TextRead, etc.), 8 items of exam instructions (ExamAtart, ExamEnd, ExamFillBlank, ExamChoice, ExamMulChoice, ExamTrueFalse, ExamListen, ExamReading), 5 items of Examining instructions (ExamDIY, ExamDIYEND, DISCRIBE, ITEM, TOPIC), and 1 item of Chinese Character study instruction (ChineseFont).

And the Nflash instructions comprise 11 items of fake instructions, 3 items of voice instructions, 13 items of drawing instructions, 3 items of figure instructions, 3 items of screen instructions, 3 items of text instructions, and 11 items of control instructions.

In the present invention, editing tool NEC.exe is applied to prepare multimedia files in new/nwc/nwx/nwf format, in step 401 (FIG. 10), preparing script file A1.txt in text format, and read-in this script file as A1.txt in text format; if error occurred in reading the file, then information of reading error will be reminded, if reading regularly, then initializing the system constant table and all the instruction's format template, and then searching all the Include instruction in the A2.txt, and analyzing its vocabulary and grammar; after that, estimating whether this analysis is correct, if incorrect, reminding an error, and if correct, proceed to step 403 and decoding all the instructions contained in the Include to the relevant positions, and creating the whole script files A3.txt; wherein, once A3.txt is created, each instruction code need be detected one by one, comprises analysis of vocabulary and grammar, if incorrect, displaying error reminding information; if correct, then detecting the specific instructions that must appeared when writing the script file through out the A3.txt; if incorrect, displaying error reminding information; if correct, detecting whether the positions of the appeared specific instructions are correct again, if incorrect, displaying error reminding information; if correct, going to step 404; and initializing the necessary environment variable with the specific instructions in the script; wherein comprises the processes of writing all the A3.txt instruction contents into the area division result file (parts of fake instructions do not create instruction code, only for setting), and labeling some of them, and re-writing index address. After that, in step 405, gathering all the area division result files, creating *.nwe, *.nwc, *.nwx or *.nwf files according to the setting of environment variable; at last, going to step 406, deleting all the interim files that occurred, such as A2.txt, A3.txt. Therefore, the multimedia courseware is created. The courseware then be downloaded to the appointed catalogue of the PMNLM via the communication and downloading module of the PMNLM.

The courseware is creased by the Nec.exe tool, it needs manually write out the A1.txt script file at first, and then edit the required courseware with Nec.exe.

In another embodiment of the present invention, a visible multimedia courseware creating tool can be applied to create the multimedia file (courseware). The visible multimedia courseware creating tool is NflashMX based on Windows, it describes the created courseware by screen operation, drawings, figures, voices, letters; so in the step 401 mentioned above, the user does not need to write TXT script file, just needs to create the multimedia object by the NflashMX visible tool and modifies it (at the same time, NflashMX will create relevant object's script instruction), the user can then edit the multimedia objects and grammar objects of the NFlashMX via the visible multimedia object creation interface. These objects are the basis for creating NFlash instruction script. When the user is saving the files, the present project will be packaged into a work file packet, and create two files that similar with text format file: a *.npr work file and a *.ns script file (these two files can be opened by notepad program); and when opening files, the selected project file packet will then be opened. The system will be editing the current created NFlash instruction script at first, then creating the result file in accordance with the NFlash instruction script.

Figure 15:
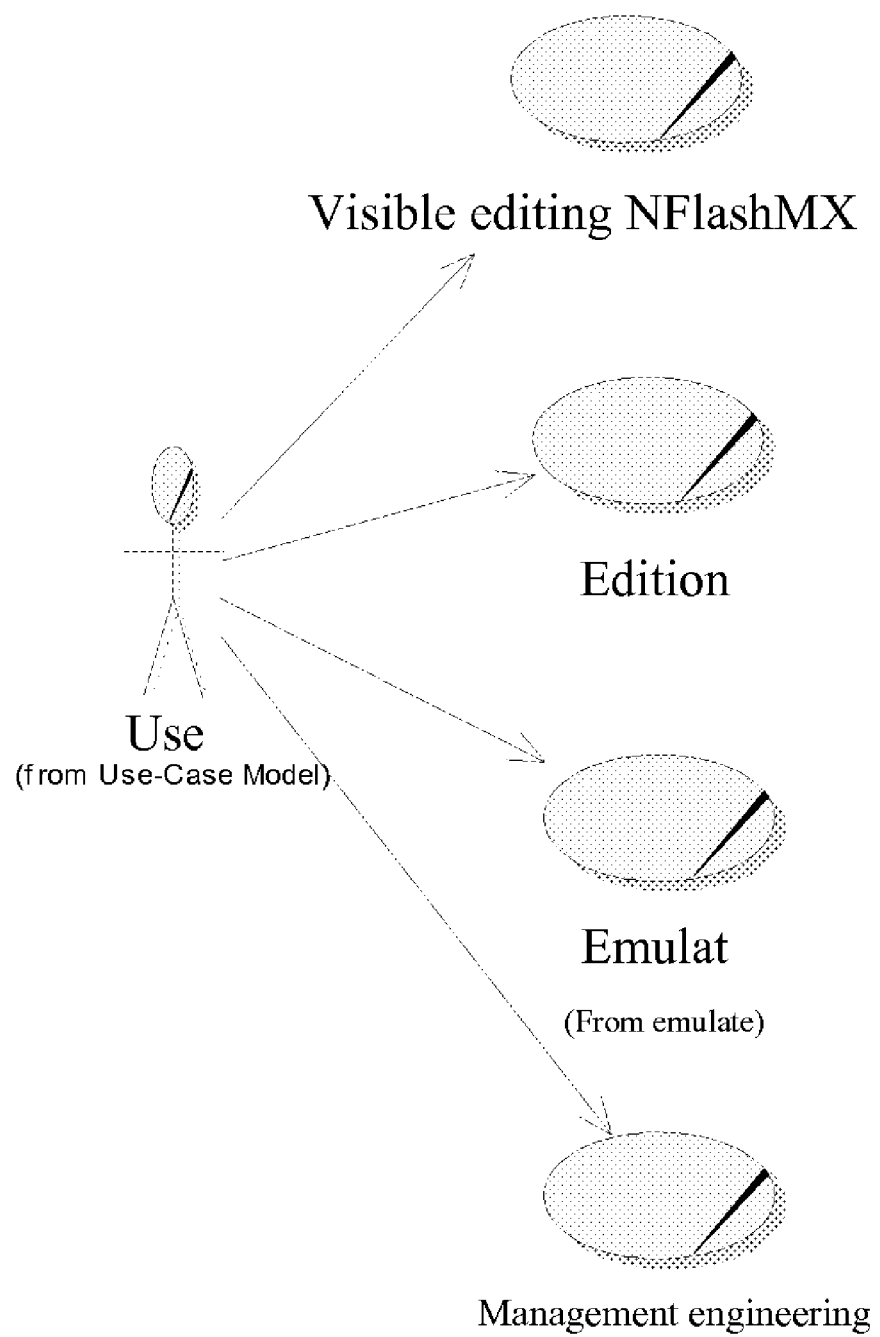
FIG. 15 shows the examples of NflashMX for preparing multimedia courseware.

Referring to FIG. 15 to describe the operation processes of NFlashMX. In one embodiment, user can edit instruction, edit script, emulating and managing courseware visibly by using NFlashMX. Once opened the NFlashMX, three lines default Chinese code will appear on the code column of the visible multimedia object creation interface, namely, 1. set machine type (such as NP3168); 2. set internal file name (such as "my courseware"); 3. set courseware information (such as "multimedia entertainment", "synchronous study", "simulate examination"). These three lines of codes are indispensable in any courseware, the user set the machine type at first, then make necessary amendment on the internal file name; the third line of the codes determines the type of the multimedia created; if select multimedia entertainment, then create NWF multimedia file; if select synchronous study in the relevant "courseware set information" column, it needs to set other information in the column, such as publisher, teaching material, grade, term and subject; the selected subject determines the type of the created courseware, if English is selected, it will create NEW English courseware, if Chinese is selected, it will create NWC Chinese courseware, other courseware is in NWF file (similarly, if "simulative exam" in the "courseware information" column is selected, it also needs to set other information in the column, such as publisher, teaching material, grade, term and subject; the selected subject determine the type of the created courseware, if English is selected, it will create NEW English courseware, if Chinese is selected, it will create NWC Chinese courseware, other courseware is in NWF file); then open the notepad program by the "view work script" order of the "tool" column in NFlashMX menu, a .ns script file in text format same as to .txt file will appear, in this script file, there is three lines of codes corresponding to the Chinese user's instruction: "NPset NP3168 (the appointed machine type is NP3168 herein), SetNFlashName and MCCdef Null" mentioned above; of course, all the scripts of the instructions can be viewed with this operation. Afterward, the user can insert and amend certain multimedia object by using the visible multimedia object creation interface, such as, once the user select "instruction options card/drawings", a "draw beeline/draw rectangle/draw circle" instruction will appear on the below; if the user click "draw circle" instruction, in the "design panel" column of the screen will appear a circle with default size, and on the left side of the screen will display relevant parameters such as abscissa of the centre of a circle, Y-coordinate of the centre of a circle, radius of the circle, color of the paintbrush, linetype, linewidth and filling-in mode, the user amend the relevant parameters of necessary and click "insert", this insertion will be enabled; and the column of code design will display user's instruction of this process in Chinese, if open the "tool/view work script" menu at the NFlashMX operation interface, one can see that the effective edit code of this operation instruction has been stored in the .ns script; then the user can follow next insertion process; further, the user can amend the drawing at any time he wants, likely, the user can control the edition effect by inputting drawings, voices, words, screen via the NflashMX. Once all the visible operations are finished, the script of the multimedia is created, then, only need to click "tool/view work script" order, the notepad program will open and the .ns script file in text format same as to .txt file is appeared. Then click the "edit" button of the NFlashMX multimedia object creation interface, the NFlashMX will start Nec.exe edition program, the "debugging" column on the screen will display the editing on the script is successful, and point out the saving path of the created multimedia file. In one embodiment of the present invention, if a saving operation has already been executed on the *.npr text format work file that can be opened by notebook program before edition, then the path of the multimedia is located in the same catalogue as to the *.npr work file; the files saved in the directory file further include the notebook program openable *.ns script file that created at the time of saving *.npr work file, and this *.ns script file is A1.ns in default. Of course, during editing, at any time if click "saving" button in the tool column, two text files that can be opened or amended by notepad program will be created and saved: work file with *.npr suffix, script file with *.ns suffix; the *.npr work file and the *.ns script file can be opened or amended by notepad program, and the effect of amendment is similar to the visible multimedia object editing that directly edited on the NFlashMX multimedia object creation interface. And further, the *.ns script file equals to the foresaid A1.txt text format script file. If the user needs to edit this project and script files to create relevant multimedia courseware files, just click the "edit" button of the NFlashMX multimedia object creation interface, the NFlashMX will start Nec.exe editing program, then the multimedia files in NWF/ NEW/NWC formats will be created according to the user's set course subjects in the "courseware information". By using this method of editing NFlashMX multimedia object and grammar object via visible multimedia object creation interface to create script file, it is more user friendly and easier to operate, and the user needs not to remember all complex instructions and rules. On the other hand, the user can also use the emulate tool of NFlashMX to imitate the created courseware on the PC, and needs not to test it on the PMNLM.

If the .nwf multimedia menu files created in accordance with the processes mentioned above satisfy with the animation menu criterion of the PMNLM, then the animation menu files in *.nmt format will be created. Normally, a plentiful group of nwf multimedia files that satisfy with the animation menu criterion of PMNLM are combined by a certain rule to create a txt script file in text format, and create the animation menu file in .nmt format by using nmt.exe edition tool, and editing and writing the nwf files into relevant Aa.txt script files in text format, and the number of the nwf files is determined by the level of the menu and all the number of the menus under all levels; opening the input Aa.txt script with nmt.exe edition tool; testing whether the grammar of a single sentence is correct; read-in all the instructions to the memory; comprehensively testing the correctness of the instruction combination and estimating whether all the related files can be read normally; comprehensively write the instructions in Aa.txt into *.nmt to create nmt animation menu files.

Once the groups of nwf multimedia files mentioned above that satisfy the animation menu criterion of PMNLM are combined by a certain rule to create a txt script file in text format, using nmt.exe editing tool to create animation menu files in .nmt format, wherein the certain rule means:

1. NMTset NMTseries (for setting "applicable machine type" in the preamble of a nmt file, and filling in "edition number"):

| Field | Explain |
|---|---|
| NMTset | Instruction for setting machine type |
| NMTseries | Machine type |

2. NMTname name (for setting internal name of .nmt file):

| Field | Explain |
|---|---|
| NMTname | Instruction for setting internal name |
| name | Internal file's name |

3. Menuitem level menu_NO. filename (for setting each nwf menu file's property, the filename must be a .nwf suffixed file):

| Field | Explain |
|---|---|
| Menuitem | Instruction for setting nwf file's property |
| level | The level of the menu |
| menu_NO. | The serial number of the menu in this level |
| filename | nwf file's name relevant to the menu |

Figure 11:
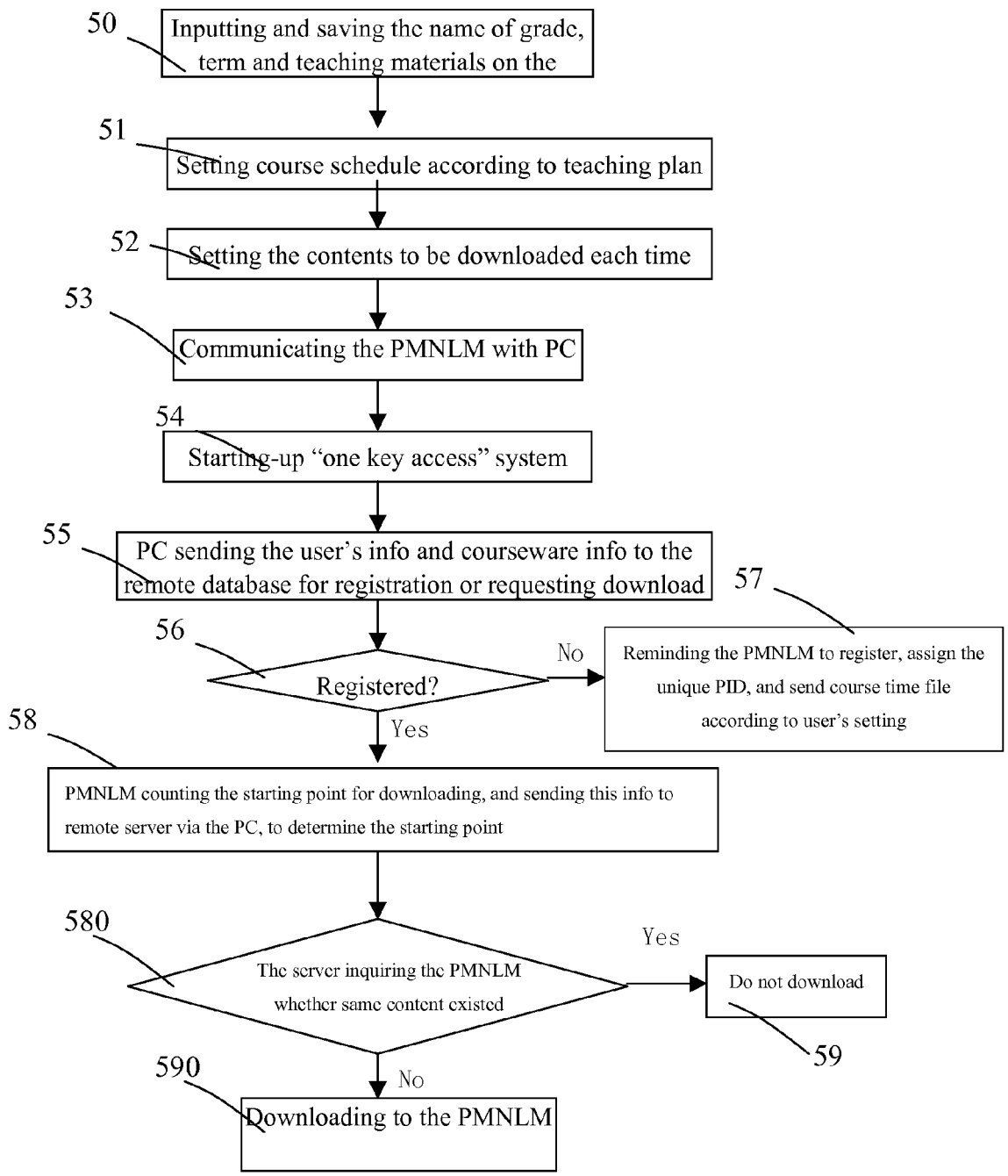
FIG. 11 shows the multimedia courseware downloading flow of the PMNLM of the present invention.

FIG. 11 shows the download flow of the PMNLM of the present invention. If the courseware is prepared by the PMNLM, this flow can be elided. The flow starts from step 50, the user inputting and saving the title of grade, term and teaching materials to be studied inside the PMNLM. In step 51, setting course schedule according to teaching arrangement, labeling the course time arrangement and effective study time, the effective study time means the time period from the beginning of term to final exam. Then goes to step 52, presetting the downloading content for each time, such as, the user can set one course or one course unit for each time the user downloads, and can appoint the content by itself. Once the preset is completed, proceed to step 53 and 54 one by one, connecting the PMNLM with the PC via a data cable and starting up the "one key access" system of the PMNLM, the PC will automatically be acquiring user's information and course schedule arrangement information; wherein the PC may automatically connect to the "one key access" remote database server 30 at the time of starting up, or driving and connecting to the "one key access" remote database server 30 after step 54. And in step 55, the PC transferring the user's information and the synchronous courseware information to the remote database server to register and request for downloading, if the remote database server found out that the user is unregistered, then proceed to step 57, reminding registering the PMNLM, and once registered, assigning the PMNLM an unique PID as identity label, and based on the information of grade, term, teaching materials and server saved outlines set by the user to download the relevant courseware files to the PMNLM; and if the user is already registered, the PMNLM will calculated the starting point of the present courseware according to the courseware file, course schedule and current system time, and transferring this information to the remote database server via the PC to determine the start point of downloading (step 58); the remote database server execute step 580, namely, the PC inquiring the PMNLM whether there is courseware that equal to the content to be downloaded existing, if exists, proceed to step 59 and will not download this courseware; if not, proceed to step 590, and downloading the courseware to the PMNLM via the PC. Thus, the whole step of setting and downloading the courseware is finished.

It is understood that in the system and method for downloading and playing multimedia files by the PMNLM of the present invention, the courseware files comprises Flash files, specific files, drawings, MIDI music and voices; wherein the courseware comprises the processes of vocabulary reciting, testing, text studying, paper examining, Chinese character studying, etc.; and the vocabulary reciting comprises transcribing, filling in blank, linking, dictating and words gaming; the testing comprises dictating, filling in blank, multi-filling, selecting and true/false; the feeding back interface can be various based on different testing results, and makes the interface dramatic and liveliness, and provides teaching and studying with more fun.

After download, if the user needs to open the courseware, there are two ways to find it: 1) pressing the relevant functional button of the PMNLM (for example, if the user wants study .nwe English courseware, there is a shortcut button for English study on the PMNLM), entering into the relevant studying interface, the courseware player will be automatically locating the current courseware to be studied and will be displaying it reversely, then selecting other courseware by up/down direction keys, and startup the playing process once the user confirmed the courseware; 2) opening the courseware schedule of the PMNLM, and pressing the page up/down buttons to select the courseware on the schedule, the PMNLM will be automatically searching then, and once the user confirmed and pressed the "enter" button, the PMNLM will startup the player, and the user can then study the downloaded content.

Figure 12:
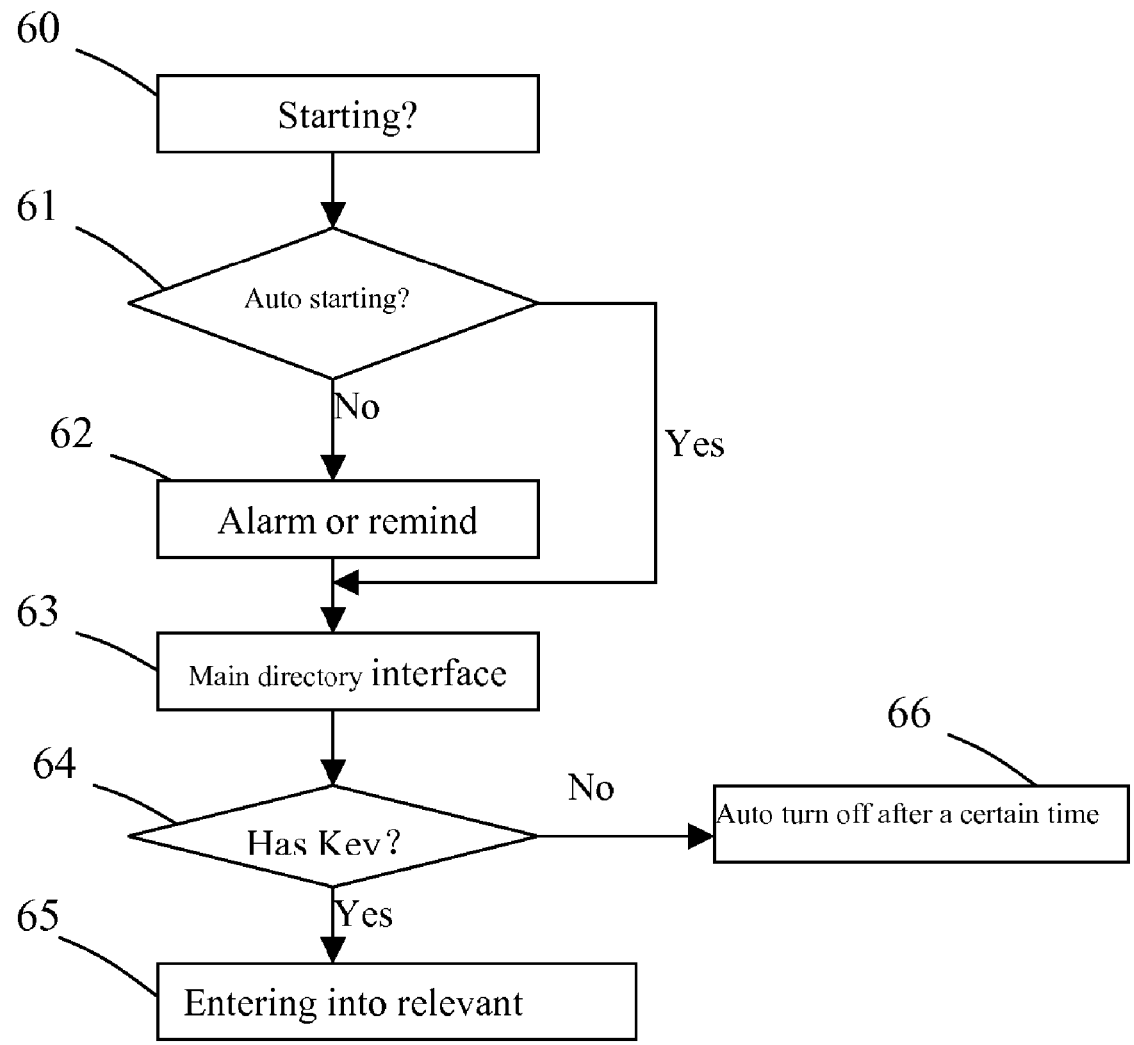
FIG. 12 shows the starting-up flow of the PMNLM of the present invention.

FIG. 12 shows the starting-up flow of the PMNLM of the present invention. Step 60 is starting up the machine by pressing the power ON/OFF button of the PMNLM; in step 61, if the auto on/off function be set, the machine will be automatically started up at the preset time, and executing step 63 to enter main directory interface; if no auto on/off be set, then executing step 62, the user turning on/off the machine manually and entering into the main directory interface; then proceed to step 64, the PMNLM will querying if there is any key pressing inputs, if there is, proceed to step 65, entering the relevant function according to the user's input; if there is not, proceed to step 66, turn off the machine after a certain time period, and the certain time period is preset by the user.

Figure 13:
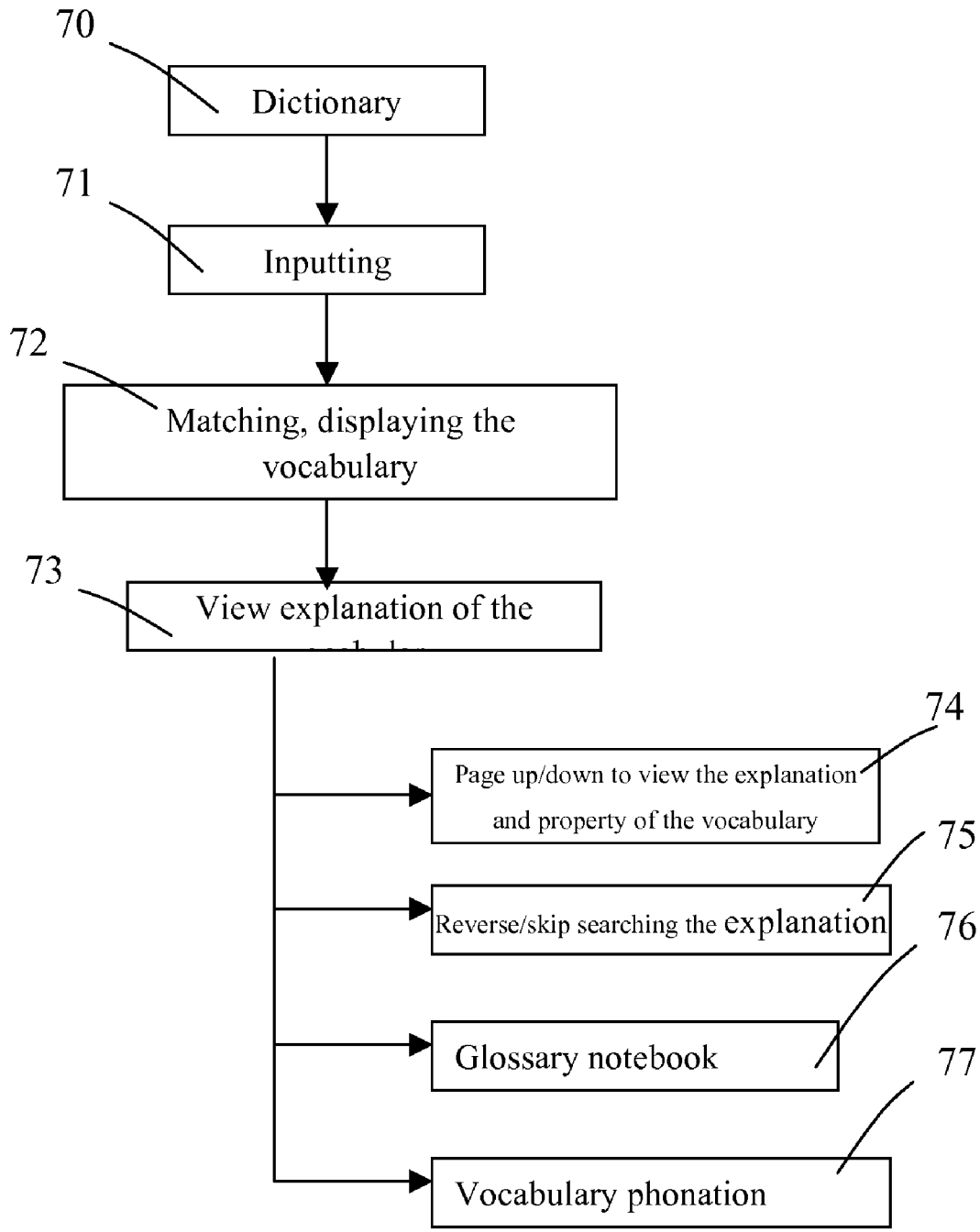
FIG. 13 shows the dictionary function implementing flow of the PMNLM of the present invention.

FIG. 13 shows the dictionary function implementing flow of the PMNLM of the present invention. In step 70, the user starting up dictionary function, then inputting the vocabularies to be searched as in step 71, the terminal device then implementing step 72 to match and display the vocabularies; the user can apply wildcard such as "?" or "*" for intangibly searches; after that, displaying the searched items and proceed to step 73, the user then may explore the explanation of them on the displayer 102; moreover, the user can further conduct the following steps: step 74: turning up/down to view the explanation of the vocabularies and their property; step 75: reverse searching or skip searching the explanation; step 76: glossary notepad operation; step 77: words vocalization operation.

Figure 14:
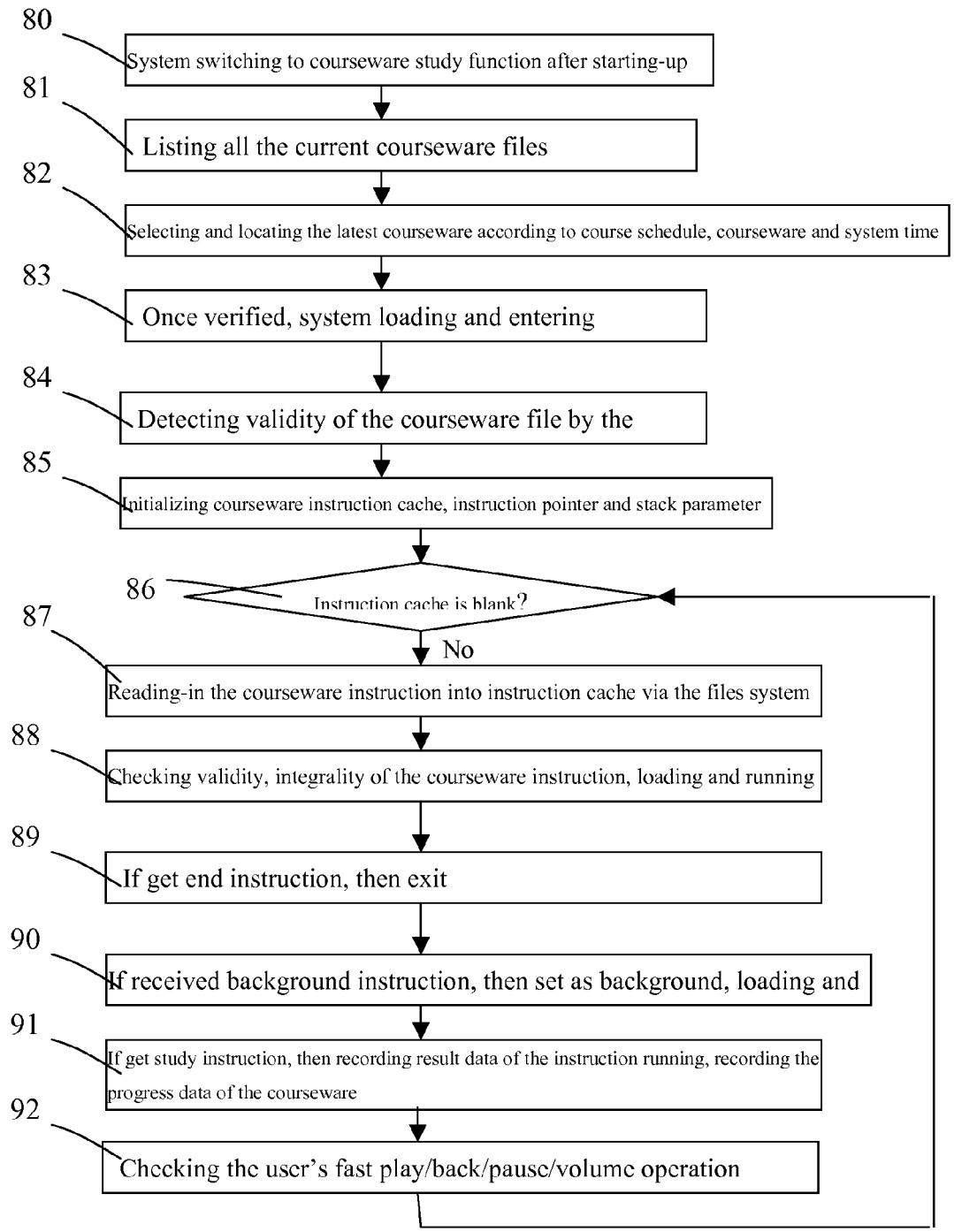
FIG. 14 shows the courseware playing flow of the PMNLM of the present invention.

FIG. 14 shows the courseware playing flow of the PMNLM of the present invention. The machine is started up in step 80, and automatically entering the courseware study function, or switched to this functional by the user; in step 81, the system of the PMNLM will be listing all the courseware; in step 82, the system locating the most recent courseware according to the course schedule, course time file and system time set by the user; in step 83, after the user verifying, the system then loading the courseware player; in step 84, the player detecting validity of the courseware file; in step 85, initializing courseware instruction cache memory, instruction pointer, stack parameter; in step 86, inquiring whether the instruction cache memory is in blank; if not, in step 87, reading-in the courseware instruction to the instruction cache memory via file system; in step 88, checking the validity, integrality of the courseware instruction, then loading and running; in step 89, if the instruction of closing is received, then exiting the system; in step 90, if the instruction of background is received, then set as background state and starting-up and running; in step 91, if get the instruction of studying, then recording the result data of instruction running as well as the progress data (comprises study result recordation, achievement recordation, study progress recordation and time recordation); in step 92, checking the user's operation of Fast Forward/Fast Reverse/Pause/Exit/Volume; at last, backs to step 96.

Figure 16:
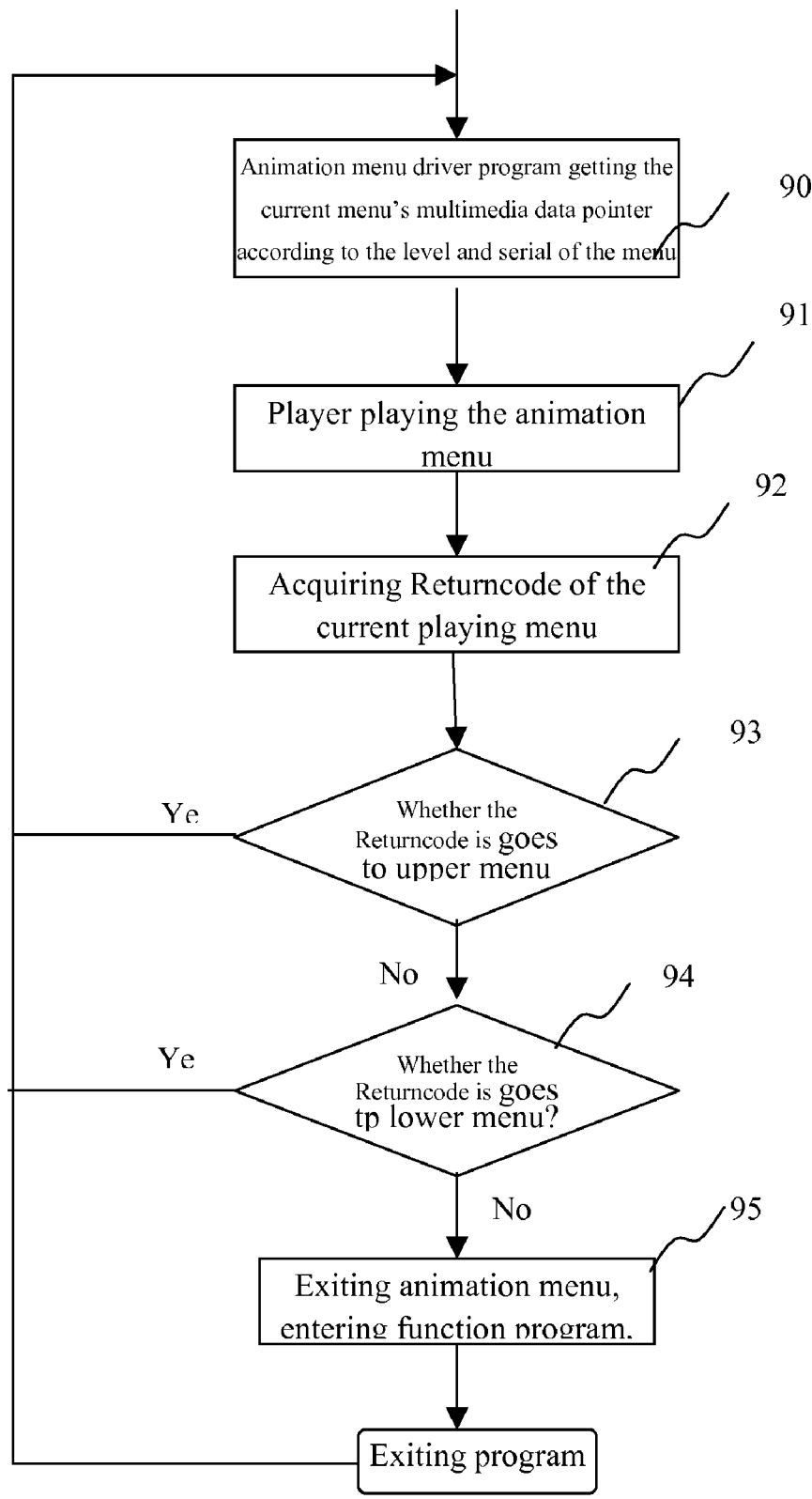
FIG. 16 shows the animation menu playing flow of the PMNLM of the present invention.

FIG. 16 shows the animation menu playing flow of the PMNLM of the present invention. At first in step 90, acquiring the animation menu data by the animation menu driver program according to the level of the menu, the serial number of the menu in the level, the animation menu comprises multimedia data pointer of the current animation menu. In the present embodiment, the system is default as root directory at the time of starting up.

Then in step 91, playing the current animation menu by Neplyer according to the multimedia data pointer of the current animation menu, namely, the current menu can be played in multimedia form; and include the steps of: loading the player that set on the PMNLM by the driven of the multimedia data pointer of the current animation menu driver program; detecting the validity of the courseware, and initializing the courseware's instruction cache, instruction pointer and stack parameter; reading the courseware instruction to the instruction cache; checking the validity and integrity of the courseware, and loading and running the courseware.

And then in step 92, acquiring the returncode of the current animation menu, and estimating whether this returncode is entering into the upper menu (step S43). For example, in one embodiment of the present invention, the rule for estimating is, if the returncode is "PREDIR", that means back to the upper menu.

In step 93, if the returncode indicates returning back to the upper menu, then back to step 90; if it did not enter into the upper menu, then estimating whether entry into the lower menu in step 94, if the returncode is "NEXTx" (wherein "x" refers to a number, means the serial of .nwf file in the lower menu), that means go to the lower menu; and when entered into the lower menu, then backs to step 90; if it did not enter the lower menu, then proceed to step S45.

In step 95, if the returncode is a functional identifier, then skipping out the animation menu and entering into the relevant functional interface to execute the functional application program.

When exiting the application program, then returns to step 90.

What is claimed is:

1. A system for transmission of remote information between multiple Portable Multimedia Network Learning Machines (PMNLM) linked with the internet, the system comprising:

at least one PMNLM, at least one PC, and a remote server, the PMNLM connected to the PC via a download cable, the remote server connected with the PC via the internet, the system further comprises;

a study-status receiving terminal; wherein the PMNLM comprises email information, a registered ID number, an input device, a memory unit for making study record and learning impression information files, and a communication transmission unit for transmitting the study record and learning impression information files to the PC automatically or by key-driven;

the PC is connected with the remote server via the internet, the study record and learning impression information files are transmitted to the remote server through the PC; wherein the remote server comprises an intelligent analyzing module to analyze the received study record and learning impression information files, to determine a synchronous teaching material, and then to generate a study-status result information;

the entire registered ID numbers of the PMNLMs and the email information not received by the study-status receiving terminal are stored in a database of the remote server; these entire registered ID numbers and email information are used for ID verification of the PC communicated PMNLM, and to send the remote information to the PMNLM through the PC;

the study-status receiving terminal is associated with the PMNLM, and comprises an information receiving module for communicating with the remote server and receiving the study-status result information;

wherein a one key access key is defined in the input device of the PMNLM for sending and receiving the remote information, and the step of sending and receiving will be automatically achieved by simply pressing the one key access key only once; and when enabling the one key access key, the PMNLM will perform the following steps via a communication transmission unit:

reading a new synchronous courseware on the remote server and inquiring downloading a matched courseware from the remote server according to course time basic information, current time of the system, course schedule and running progress of a courseware correlative unit;

uploading a user's teaching impression information file comprising at least one of a number times of the courseware ran, running recordation or study tracking;

updating or amending contents of the courseware correlative unit to make the contents of the courseware correlative unit synchronously reflect using status of current courseware;

enabling the user's teaching impression information file to be sent to the study-status receiving terminal.

2. The system as in claim 1, wherein the PC is installed with communication driver programs of automatically sending, receiving and downloading; the PMNLM is installed with a processing program, an email edition software and an email playing software in response to instruction from the communication driver programs; and the information transmission between the PMNLM and PC complies with a one key access communication protocol; and the information transmission between the remote server and PC complies with TCP/IP communication protocol.

3. The system as in claim 2, wherein the study-status receiving terminal is a mobile phone with short message service, a landline phone or an email receiving device; and a short message sending module for sending the study-status result information is provided between the remote server and the study-status receiving terminal, wherein the study-status result information received from the remote server based on a user's subscription comprises attendance information, study trends information, homework analyzing, examination ranking, parts or all of reviewing guidance.

4. The system as in claim 1, wherein a serial number is provided to associate the study-status receiving terminal, PMNLM, PC, synchronous teaching materials that download/upload from/to the remote server, and for sending a teaching impression information file to the remote server; at least one part of the serial number is generated at the first time the PMNLM logs on to the remote server, and each PMNLM generates unique serial number the first time it logs on.

5. The system as in of claim 2, wherein a serial number is provided to associate the study-status receiving terminal, PMNLM, PC, synchronous teaching materials that download/upload from/to the remote server, and for sending a teaching impression information file to the remote server; at least one part of the serial number is generated at the first time the PMNLM logs on to the remote server, and each PMNLM generates unique serial number the first time it logs on.

6. The system as in of claim 3, wherein a serial number is provided to associate the study-status receiving terminal, PMNLM, PC, synchronous teaching materials that download/upload from/to the remote server, and for sending a teaching impression information file to the remote server; at least one part of the serial number is generated at the first time the PMNLM logs on to the remote server, and each PMNLM generates unique serial number the first time it logs on.

7. A method for implementing information transmission between multiple PMNLMs, which is achieved inside a system with a at least one PMNLM, at least one PC, a remote server, a study-status receiving terminal, and a NMAIL management controller, wherein the
PMNLM and PC intercommunicates with each other, the method comprising;
sending and receiving information between the PMNLM, the PC and the remote server, where each PMNLM comprises email information and a registered ID number, the PC is installed with communication driver programs, and wherein the entire registered ID numbers of the PMNLMs and email information not received by the study-status receiving terminal are stored in a database of the remote server; and wherein sending and receiving information comprises:
(a) setting status of the information to be sent as pre-send on the PMNLM, and setting a serial number on the PMNLM for receiving information;
(b) communicating the PMNLM and PC, then perform automatically handshake authentication thereof;
(c) the communication driver program of the PC automatically inquiring the PMNLM whether there is any mail information need to be sent, the PMNLM then starting the NMAIL management controller to detect whether there is any mail information need to be sent in a user's send-box, and then responding to the PC;
(d) automatically uploading and encrypting the information to the PC, if there is information need to be sent;
(e) automatically connecting the remote server with the PC, and uploading the information need to be sent to the database of the remote server, then recording the ID serial number of the PMNLM which is sending and receiving the information;
(f) deleting mail that has already been sent from the send-box, or transferring to a sent-box;
sending and receiving information further comprises:
(h) connecting and handshaking the PMNLM and the PC on the internet;
(i) acquiring the ID serial number of the PMNLM that is connected with the PC by handshaking;
(j) the PC automatically connecting with the database of the remote server, and searching whether any mail information for the PMNLM with the corresponding ID serial number exists in the database;
(k) downloading the mail information which belongs to the PMNLM with the corresponding ID serial number to the PC, if such information exists;
(l) the communication driver program of the PC then automatically decoding the information downloaded from the remote server to an in-box of the user's PMNLM;
(m) labeling the mail information as already be sent in the database of the remote server;
wherein a one key access key is defined in an input device of the PMNLM for sending and receiving the information, and the step of sending and receiving will be automatically achieved by simply pressing the one key access key only once; and
when enabling the one key access key, the PMNLM will perform the following steps via a communication transmission unit:
reading a new synchronous courseware on the remote server and inquiring downloading a matched courseware from the remote server according to course time basic information, current time of the system, course schedule and running progress of a courseware correlative unit;
uploading a user's teaching impression information file comprising at least one of a number of times the courseware ran, running recordation or study tracking;
updating or amending contents of the courseware correlative unit to make the contents of the courseware correlative unit synchronously reflect using status of current courseware;
enabling the user's teaching impression information file to be sent to the study-status receiving terminal.

* * * * *